United States Patent
Shin et al.

(10) Patent No.: US 10,037,159 B2
(45) Date of Patent: Jul. 31, 2018

(54) MEMORY SYSTEM AND OPERATING METHOD THEREOF

(71) Applicant: SK hynix Inc., Gyeonggi-do (KR)

(72) Inventors: Dong-Jae Shin, Gyeonggi-do (KR); Jong-Ju Park, Gyeonggi-do (KR); Young-Jin Park, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 77 days.

(21) Appl. No.: 14/674,903

(22) Filed: Mar. 31, 2015

(65) Prior Publication Data

US 2016/0116972 A1    Apr. 28, 2016

(30) Foreign Application Priority Data

Oct. 24, 2014    (KR) .................. 10-2014-0145223

(51) Int. Cl.
*G06F 12/00* (2006.01)
*G06F 3/06* (2006.01)
*G06F 1/32* (2006.01)

(52) U.S. Cl.
CPC .......... *G06F 3/0625* (2013.01); *G06F 1/3225* (2013.01); *G06F 1/3268* (2013.01); *G06F 1/3275* (2013.01); *G06F 3/0619* (2013.01); *G06F 3/0634* (2013.01); *G06F 3/0659* (2013.01); *G06F 3/0673* (2013.01); *Y02D 10/13* (2018.01); *Y02D 10/14* (2018.01); *Y02D 10/154* (2018.01)

(58) Field of Classification Search
CPC .... G06F 1/3287; G06F 3/0625; G06F 3/0634; G06F 3/0673; G06F 3/0659; G06F 3/0619; G06F 1/3275
See application file for complete search history.

(56) References Cited

U.S. PATENT DOCUMENTS

| | | | |
|---|---|---|---|
| 8,412,020 B2 | 4/2013 | Abe | |
| 2011/0276817 A1* | 11/2011 | Fullerton | G06F 1/3203 713/324 |
| 2013/0297855 A1* | 11/2013 | Gupta | G06F 3/0656 711/103 |
| 2014/0040650 A1* | 2/2014 | Hida | G06F 1/3275 713/324 |
| 2014/0208019 A1* | 7/2014 | Wu | G06F 12/0866 711/113 |

FOREIGN PATENT DOCUMENTS

| | | |
|---|---|---|
| KR | 1020060097585 | 9/2006 |
| KR | 1020100042611 | 4/2010 |
| KR | 1020110041675 | 4/2011 |
| KR | 1020140034333 | 3/2014 |

* cited by examiner

*Primary Examiner* — David X Yi
*Assistant Examiner* — Alan Otto
(74) *Attorney, Agent, or Firm* — IP & T Group LLP

(57) ABSTRACT

A memory system includes a memory device including a plurality of blocks and a plurality of page buffers which respectively correspond to the blocks, wherein each of the blocks includes a plurality of pages in which data is stored, and a controller suitable for backing up data, which is stored in a memory included in the controller, in the page buffers when an operation mode is about to change to a power save mode.

16 Claims, 13 Drawing Sheets

MEMORY SYSTEM AND OPERATING METHOD THEREOF

CROSS-REFERENCE TO RELATED APPLICATIONS

The present application claims priority of Korean Patent Application No. 10-2014-0145223, filed on Oct. 24, 2014, which is incorporated herein by reference in its entirety.

BACKGROUND

1. Field

Exemplary embodiments of the present invention relate to a memory system and, more particularly, to a memory system and an operating method thereof.

2. Description of the Related Art

Recently, the paradigm for the computing environment has changed to ubiquitous computing in which computer systems can be used anytime and anywhere. Due to this fact, the use of portable electronic devices such as mobile phones, digital cameras, and notebook computers has rapidly increased. In general, such portable electronic devices use a memory system (or a data storage device) including a memory device. A data storage device is used as a main memory or an auxiliary memory of the portable electronic devices.

A data storage device including a memory device provides advantages in that an information access speed is relatively high and power consumption is relatively small. In addition, since it does not need moving parts, stability and durability are excellent. Data storage devices having such advantages include universal serial bus (USB) memory devices, memory cards having various interfaces, and solid-state drives (SSD).

SUMMARY

Various embodiments of the present invention are directed to a memory system capable of minimizing power consumption, and an operating method thereof.

In an embodiment of the present invention, a memory system may include: a memory device including a plurality of blocks and a plurality of page buffers, which respectively correspond to the blocks, wherein each of the blocks includes a plurality of pages in which data is stored; and a controller suitable for backing up data, which is stored in a memory included in the controller, in the page buffers when an operation mode is about to change to a power save mode.

The memory may include: a plurality of memory units and a plurality of buffer units.

The controller may recovers the data backed up in the page buffers, to the memory, when the operation mode is about to change from the power save mode to an active mode.

Before the power save mode begins, the controller may backs up the data stored in the memory units and the buffer units, simultaneously or sequentially, in the page buffers based on priorities, and when the operation is about to change from the power save mode to the active mode, the controller may recovers the data backed up in the page buffers, to the respective corresponding memory units and buffer units.

The priorities may be determined based on uses of the data stored in the memory units and the buffer units.

The priorities may be determined based on recovery orders of the data stored in the memory units and the buffer units, when the operation mode is about to change from the power save mode to the active mode.

The priorities may be determined based on power consumption amounts of the memory units and the buffer units in the active mode.

The priorities may be determined based on sizes of the data stored in the memory units and the buffer units.

The priorities may be determined based on latencies of the data stored in the memory units and the buffer units, the latencies may include: latencies in backing up the data stored in the memory units and the buffer units in the page buffers, and/or latencies in recovering the data backed up in the page buffers to the respective corresponding memory units and buffer units.

The controller may changes the operation mode from the active mode to the power save mode when an operation mode change command is received from a host or an operation in the active mode is not performed for a predetermined time, and the controller may changes the operation mode from the power save mode to the active mode when the operation mode change command is received from the host or performance of an operation in the active mode is detected.

When the operation mode change command may be received from the host, the priorities are received.

The controller may stores data storage information indicating that the data stored in the memory units and the buffer units are backed up in the page buffers, in a register that retains a power-on state in the power save mode, before the operation mode changes from the active mode to the power save mode.

The register may be included in a program memory or a power management unit (PMU), which is included in the controller.

In an embodiment of the present invention, a method for operating a memory system including a memory device and a controller may include: storing data in a plurality of pages included in the memory device, in an active mode; storing data corresponding to an operation in the active mode, in a memory included in the controller; backing up the data stored in the memory, in a plurality of page buffers, when an operation mode is about to change from the active mode to a power save mode; and recovering the data backed up in the page buffers to the memory when the operation mode is about to change from the power save mode to the active mode.

The memory may include: a plurality of memory units and a plurality of buffer units.

The data stored in the memory units and the buffer units may be backed up simultaneously or sequentially in the page buffers based on priorities, before the power save mode begins, and the data backed up in the page buffers may be recovered to the respective corresponding memory units and buffer units, when the operation is about to change from the power save mode to the active mode.

The priorities may be determined based on at least one of power consumption amounts of the memory units and the buffer units in the active mode and uses, sizes, and latencies of the data stored in the memory units and the buffer units.

The priorities may be determined based on latencies of the data stored in the memory units and the buffer units, the latencies may include: latencies in backing up the data stored in the memory units and the buffer units, in the page buffers, and/or latencies in recovering the data backed up in the page buffers, to the respective corresponding memory units and buffer units.

The change to the power save mode may be made when an operation mode change command is received from a host or an operation in the active mode is not performed for a predetermined time, and the change to the active mode may be made when the operation mode change command is received from the host or performance of an operation in the active mode is detected.

In the backing up the data, data storage information, indicating that the data stored in the memory units and the buffer units may be backed up in the page buffers, is stored in a register that retains a power-on state in the power save mode, before the change to the power save mode from the active mode.

DETAILED DESCRIPTION

Figure 1:
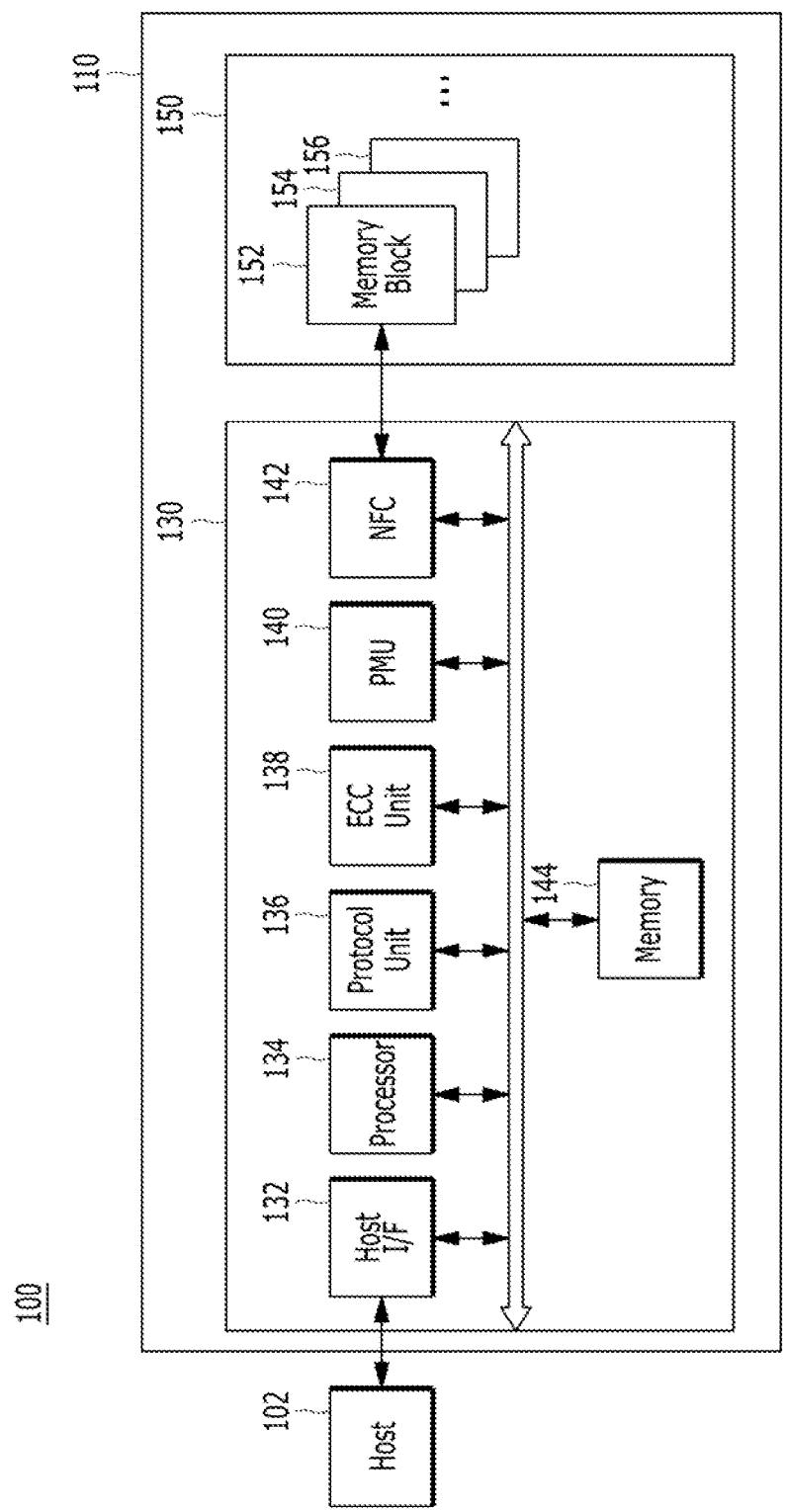
FIG. 1 is a diagram illustrating a data processing system including a memory system in accordance with an embodiment of the present invention.

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts in the various figures and embodiments of the present invention.

It is also noted that in this specification, "connected/coupled" refers to one component not only directly coupling another component, but also indirectly coupling another component through an intermediate component. In addition, a singular form may include a plural form as long as it is not specifically mentioned. It should be readily understood that the meaning of "on" and "over" in the present disclosure should be interpreted in the broadest manner such that "on" means not only "directly on" but also "on" something with an intermediate feature(s) or a layer(s) therebetween, and that "over" means not only directly on top but also on top of something with an intermediate feature(s) or a layer(s) therebetween. When a first layer is referred to as being "on" a second layer or "on" a substrate, it not only refers to where the first layer is formed directly on the second layer or the substrate but also where a third layer exists between the first layer and the second layer or the substrate.

FIG. 1 is a diagram illustrating a data processing system 100 including a memory system in accordance with an embodiment of the present invention.

Referring to FIG. 1, the data processing system 100 may include a host 102 and a memory system 110.

The host 102 includes, for example, a portable electronic device such as a mobile phone, an MP3 player and a laptop computer or an electronic device such as a desktop computer, a game player, a TV and a projector.

The memory system 110 operates in response to a request from the host 102, and in particular, stores data to be accessed by the host 102. In other words, the memory system 110 may be used as a main memory or an auxiliary memory of the host 102. The memory system 110 may be realized as any one of various kinds of storage devices, according to the protocol of a host interface to be electrically coupled with the host 102. For example, the memory system 110 may be realized as any one of various kinds of storage devices such as a solid-state drive (SSD), a multimedia card in the form of an MMC, an eMMC (embedded MMC), an RS-MMC (reduced size MMC) and a micro-MMC a secure digital card in the form of an SD, a mini-SD and a micro-SD a universal serial bus (USB) storage device, a universal flash storage (UFS) device, a compact flash (CF) card, a smart media card, a memory stick, and so forth.

The storage devices forming the memory system 110 may be realized as a volatile memory device such as a dynamic random access memory (DRAM) and a static random access memory (SRAM) or a nonvolatile memory device such as a read only memory (ROM), a mask ROM (MROM), a programmable ROM (PROM), an erasable programmable ROM (EPROM), an electrically erasable programmable ROM (EEPROM), an ferroelectric random access memory (FRAM), a phase change RAM (PRAM), a magnetic RAM (MRAM) and a resistive RAM (RRAM).

The memory system 110 includes a memory device 150. The memory device 150 stores data to be accessed by the host 102, and a controller 130 which controls the memory device 150 to store data.

The controller 130 and the memory device 150 may be integrated into one semiconductor device. For instance, the controller 130 and the memory device 150 may be integrated into one semiconductor device to form a solid-state drive (SSD). When the memory system 110 is used in SSD form, the operation speed of the host 102, which is electrically coupled with the memory system 110, may be significantly increased.

The controller 130 and the memory device 150 may be integrated into one semiconductor device to form a memory card. For example, the controller 130 and the memory card 150 may be integrated into one semiconductor device to form a memory card such as a personal computer memory card international association (PCMCIA) card, a compact flash (CF) card, a smart media card in the form of an SM and an SMC, a memory stick, a multimedia card in the form of an MMC, an RS-MMC and a micro-MMC a secure digital card in the form of an SD, a mini-SD, a micro-SD and an SDHC, and a universal flash storage (UFS) device.

Further, the memory system 110 may form a computer, an ultra mobile PC (UMPC), a workstation, a net-book, a personal digital assistant (PDA) a portable computer, a web tablet, a tablet computer, a wireless phone, a mobile phone, a smart phone, an e-book, a portable multimedia player (PMP), a portable game player, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage for a data center, a device capable of transmitting and receiving information under a wireless environment, one of various electronic devices for home network, one of various electronic devices for a computer network, one of various electronic devices for a telematics network, an RFID device, or one of various component elements for a computing system.

The memory device 150 may retain stored data even when power is blocked, store the data provided from the host 102 through a write operation, and provide stored data to the host 102, through a read operation. The memory device 150 may include a plurality of memory blocks 152, 154 and 156. Each of the memory blocks 152, 154 and 156 includes a plurality of pages. Each of the pages includes a plurality of memory cells to which a plurality of word lines (WL) are electrically coupled. The memory device 150 may be a nonvolatile memory device, for example, a flash memory. The flash memory may have a 3D stack structure. Since the structure of the memory device 150 and the 3D stack structure of the memory device 150 will be described later in detail with reference to FIGS. 2 to 11, detailed descriptions thereof will be omitted herein.

The controller 130 of the memory system 110 controls the memory device 150 in response to a request from the host 102. For example, the controller 130 provides the data read from the memory device 150, to the host 102, and stores the data provided from the host 102, in the memory device 150. To this end, the controller 130 controls the operations of the memory device 150, such as read, write, program and erase operations.

In detail, the controller 130 may include a host interface (I/F) 132, a processor 134, a protocol unit 136 an error correction code (ECC) unit 138, a power management unit (PMU) 140, a NAND flash controller (NFC) 142, and a memory 144.

The host interface 132 processes the commands and data of the host 102, and may communicate with the host 102 through at least one of various interface protocols such as a universal serial bus (USB), a multimedia card (MMC), a peripheral component interconnect-express (PCI-E), a serial attached SCSI (SAS), a serial advanced technology attachment (SATA), a parallel advanced technology attachment (DATA), a small computer system interface (SCSI), an enhanced small disk interface (ESDI), and integrated drive electronics (IDE).

The ECC unit 138 detects and corrects an error included in the data read from the memory device 150 when reading the data stored in the memory device 150. That is to say, after performing error correction decoding for the data read from the memory device 150, the ECC unit 138 may determine whether the error correction decoding has succeeded, output an indication signal according to a determination result, and correct an error bit of the read data by using the parity bit generated in an ECC encoding process. The ECC unit 138 may not correct error bits if error bits occur by a number equal to or greater than a threshold number of correctable error bits, and may output an error correction fail signal corresponding to incapability of correcting error bits.

The ECC unit 138 may perform error correction by using a low density parity check (LDPC) code, a Bose, Chaudhuri, and Hocquenghem (BCH) code, a turbo code, a Reed-Solomon code, a convolution code, a recursive systematic code (RSC), a trellis-coded modulation (TCM) or a block coded modulation (BCM). The ECC unit 138 may include all circuits, systems or devices for error correction.

The protocol unit 136 stores and manages protocols for the controller 130 to control the memory device 150 in response to a request from the host 102. The PMU 140 provides and manages power for the controller 130, that is, power for the component elements included in the controller 130.

The NFC 142, as a memory interface which performs interfacing between the controller 130 and the memory device 150 to allow the controller 130 to control the memory device 150 in response to a request from the host 102, generates control signals for the memory device 150 and processes data according to the control of the processor 134, when the memory device 150 is a flash memory (e.g., a NAND flash memory).

The memory 144, as the working memory of the memory system 110 and the controller 130, stores data for driving of the memory system 110 and the controller 130. Specifically, when the controller 130 controls the memory device 150 in response to a request from the host 102. For example, when the controller 130 provides the data read from the memory device 150 to the host 102, and stores the data provided from the host 102 in the memory device 150, and, to this end, when the controller 130 controls the operations of the memory device 150, such as read, write, program and erase operations, the memory 144 stores data needed to allow such operations to be performed between the controller 130 and the memory device 150.

The memory 144 may be formed of a volatile memory such as a static random access memory (SRAM) or a dynamic random access memory (DRAM). As described above, the memory 144 stores data needed to perform data read and write operations between the host 102 and the memory device 150, and data when performing the data read and write operations. For such storage of data, the memory 144 may include a program memory, a data memory, a write buffer, a read buffer, a map buffer, and so forth.

The processor 134 controls the general operations of the memory system 110, and controls a write operation or a read operation for the memory device 150, in response to a write request or a read request from the host 102. The processor 134 drives firmware, which is referred to as a flash translation layer (FTL), to control the general operations of the memory system 110. The processor 134 may be formed of a microprocessor or a central processing unit (CPU).

A management unit (not shown) for performing management of failed blocks, for example, bad block management, of the memory device 150 may be included in the processor 134. The management unit checks a bad block among the memory blocks included in the memory device 150, and performs the bad block management for processing the checked bad block, as a bad one. When the memory device 150 is a flash memory (e.g., a NAND flash memory), a program fail may occur when data is programmed, due to the characteristics of the NAND flash memory. Again, bad block management is the processing of memory blocks in which program failures have occurred, as a bad one, and programming the program-failed data in new memory blocks. Hereinbelow, the memory device in the memory system in accordance with an embodiment of the present invention will be described in detail with reference to FIGS. 2 to 11.

Figure 2:
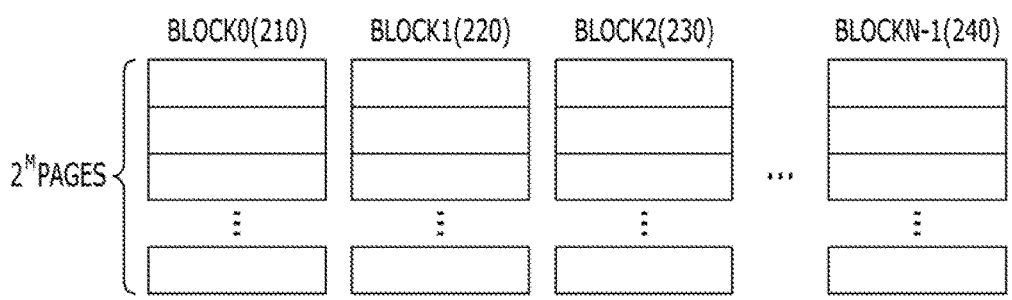
FIG. 2 is a detailed diagram of a memory device in the memory system shown in FIG. 1.
Figure 3:
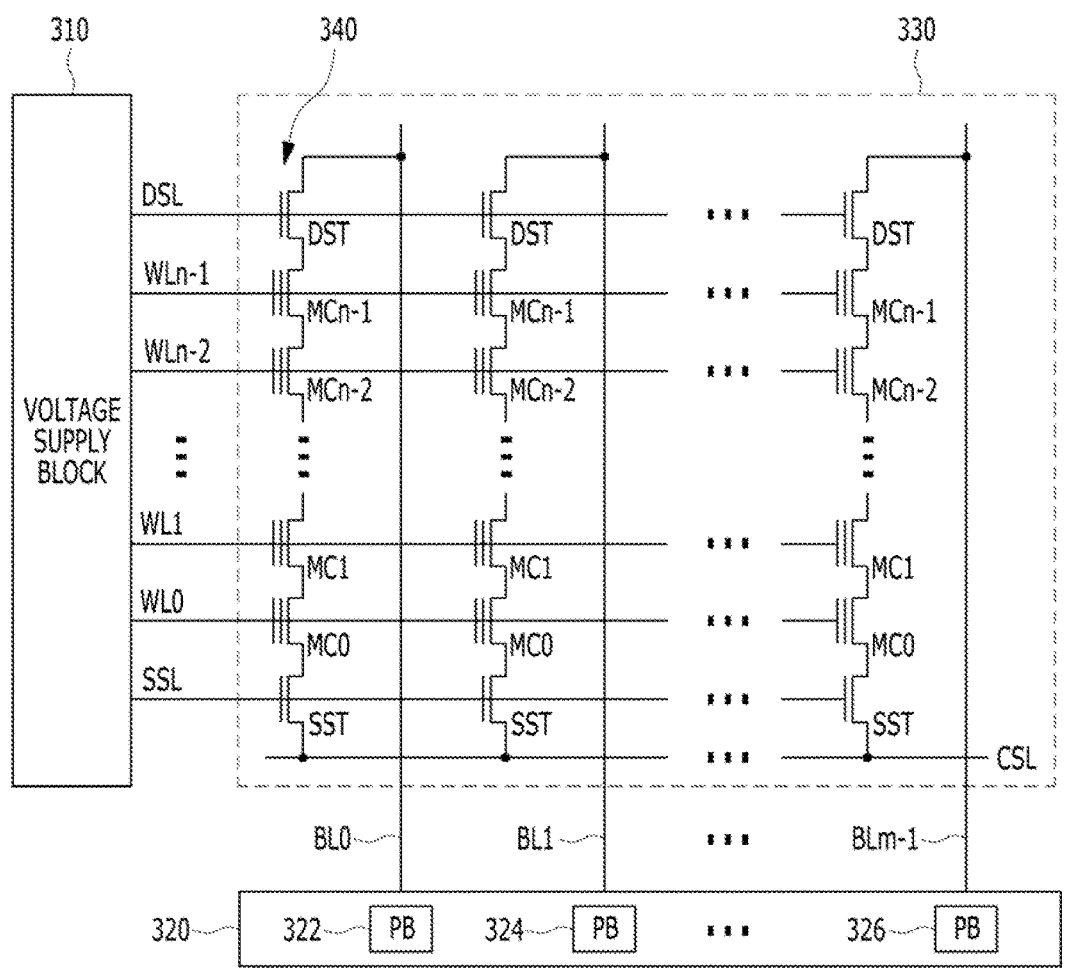
FIG. 3 is a diagram of a memory cell array circuit of a memory block in the memory device shown in FIG. 2.

FIG. 2 is a detailed diagram of the memory device 150 shown in FIG. 1, FIG. 3 is a diagram of a memory cell array circuit of a memory block in the memory device 150 shown in FIG. 2, and FIGS. 4 to 11 are diagrams for describing the memory device 150 shown in FIG. 1 when the memory device 150 is realized as a three-dimensional nonvolatile memory device.

Referring to FIG. 2, the memory device 150 includes a plurality of memory blocks, for example, a zeroth block (BLOCK0) 210, a first block (BLOCK1) 220, a second block (BLOCK2) 230 and an N-1$^{th}$ block (BLOCKN-1) 240. Each of the blocks 210, 220, 230 and 240 includes a plurality of pages, for example, $2^M$ number of pages ($2^M$PAGES). While it is described for the sake of convenience that each of the memory blocks includes $2^M$ number of pages, it is to be noted that each of the memory blocks may include M number of pages. Each of the pages includes a plurality of memory cells to which a plurality of word lines are electrically coupled.

Each of the memory blocks 210, 220, 230 and 240 stores the data provided from the host device 102 through a write operation, and provides the stored data to the host 102 through a read operation.

Referring to FIG. 3, in the memory system 110, a memory block 330 of a memory device 300 may include a plurality of cell strings 340 which are electrically coupled to bit lines BL0 to BLm-1, respectively. The cell string 340 of each column may include at least one drain select transistor DST and at least one source select transistor SST. A plurality of memory cell transistors MC0 to MCn-1 may be electrically coupled in series between the select transistors DST and SST. The respective memory cells MC0 to MCn-1 may be configured by multi-level cells (MLC), each of which stores data information of a plurality of bits. The strings 340 may be electrically coupled to corresponding bit lines BL0 to BLm-1 respectively. For reference, in FIG. 3, 'DSL' denotes a drain select line, 'SSL' denotes a source select line, and 'CSL' denotes a common source line.

While FIG. 3 shows, as an example, the memory block 330 which is formed of NAND flash memory cells, it is to be noted that the memory block 330 of the memory device 300 in accordance with the embodiment of the present invention is not limited to NAND flash memory and may be formed of NOR flash memory, hybrid flash memory (in which at least two kinds of memory cells are combined), or One-NAND flash memory that has a controller built in the memory chip. The operational characteristics of a semiconductor device may be applied to not only a flash memory device in which a charge storing layer is configured by conductive floating gates but also a charge trap flash (CTF) in which a charge storing layer has a dielectric layer.

A voltage supply block 310 of the memory device 300 may provide word line voltages, for example, a program voltage, a read voltage and a pass voltage, to be supplied to respective word lines according to an operation mode and voltages to be supplied to bulks, for example, well regions, where memory cells are formed. The voltage generating operation of the voltage supply block 310 may be performed by the control of a control circuit (not shown). The voltage supply block 310 may generate a plurality of variable read voltages to generate a plurality of read data, select one of the memory blocks (or sectors) of a memory cell array under the control of the control circuit, select one of the word lines of the selected memory block, and provide the word line voltages to the selected word line and unselected word lines.

A read/write circuit 320 of the memory device 300 is controlled by the control circuit, and may operate as a sense amplifier or a write driver according to an operation mode. For example, in a verification/normal read operation, the read/write circuit 320 may operate as a sense amplifier for reading data from the memory cell array. Also, in a program operation, the read/write circuit 320 may operate as a write driver, which drives bit lines according to data to be stored in the memory cell array. The read/write circuit 320 may receive data to be written in the memory cell array, from a buffer (not shown), in a program operation, and may drive the bit lines according to the inputted data. To this end, the read/write circuit 320 may include a plurality of page buffers (PBs) 322, 324 and 326 respectively corresponding to columns (or bit lines) or pairs of columns (or pairs of bit lines), and a plurality of latches (not shown) may be included in each of the page buffers 322, 324 and 326. Hereinbelow, detailed descriptions will be made with reference to FIGS. 4 to 11, for the memory device in the memory system 110 in accordance with the embodiment of the present invention, when the memory device is realized as a 3-dimensional nonvolatile memory device.

Figure 4:
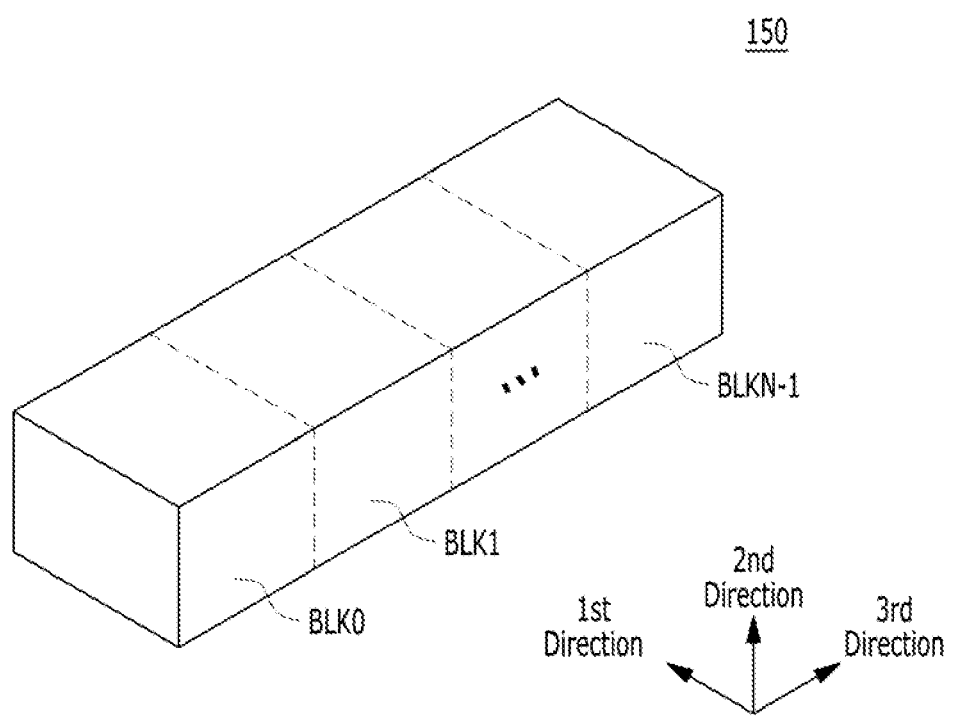
FIGS. 4 to 11 are diagrams for describing the memory device in the memory system shown in FIG. 1.

Referring to FIG. 4, as described above, the memory device 150 may include a plurality of memory blocks BLK0 to BLKN-1. FIG. 4 is a block diagram illustrating the memory block of the memory device 150 shown in FIG. 2, and each of the memory blocks BLK may be realized in a 3-dimensional structure (or a vertical structure). For example, the respective memory blocks BLK may include structures which extend in first to third directions, for example, the x-axis direction, the y-axis direction and the z-axis direction.

The respective memory blocks BLK may include a plurality of NAND strings NS which extend in the second direction. The NAND strings may be provided in the first direction and the third direction. Each NAND string may be electrically coupled to a bit line, at least one source select line, at least one ground select line, a plurality of word lines, at least one dummy word line, and a common source line. Namely, the respective memory blocks may be electrically coupled to a plurality of bit lines, a plurality of source select lines, a plurality of ground select lines, a plurality of word lines, a plurality of dummy word lines, and a plurality of common source lines.

Figure 5:
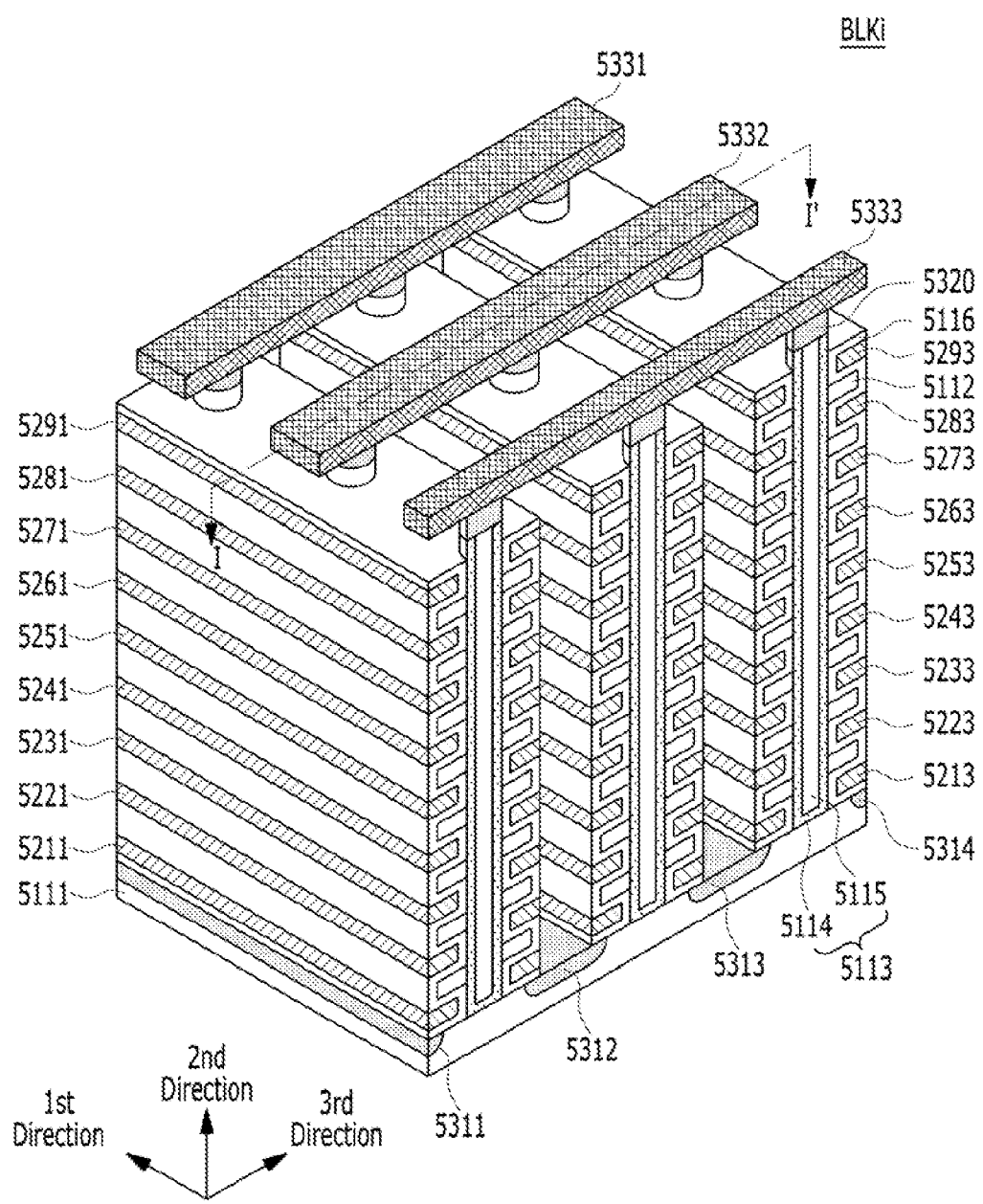
Figure 6:
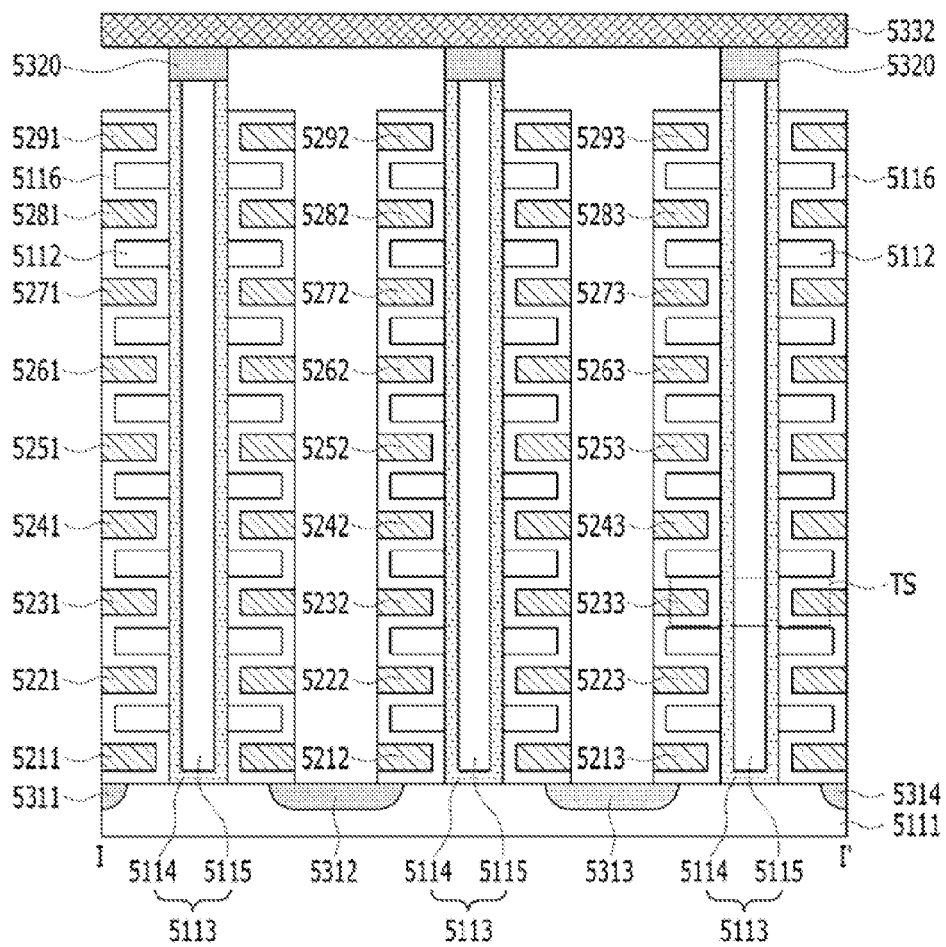

Referring to FIGS. 5 and 6, a certain memory block BLKi among the memory blocks of the memory device 150 may include structures which extend in the first to third directions. FIG. 5 is a perspective view schematically illustrating structures for when the memory device in accordance with an embodiment of the present invention is realized as a 3-dimensional nonvolatile memory device of a first structure and showing a certain memory block BLKi realized to have the first structure in the memory blocks of FIG. 4, and FIG. 6 is a cross-sectional view taken along the line of FIG. 5.

A substrate 5111 may be provided. For example, the substrate 5111 may include a silicon material doped with a first type impurity. For example, the substrate 5111 may include a silicon material doped with a p-type impurity or may be a p-type well e.g., a pocket p-well) and include an n-type well, which surrounds the p-type well. While it is assumed in the following, for the sake of convenience, that the substrate 5111 is p-type silicon, it is to be noted that the substrate 5111 is not limited to p-type silicon.

A plurality of doping regions 5311, 5312, 5313 and 5314, which extend in the first direction may be provided on the substrate 5111. For example, the doping regions 5311, 5312, 5313 and 5314 may be a second type, which different from the substrate 5111. For example, the doping regions 5311, 5312, 5313 and 5314 may be n-type. While it is assumed in the following, for the sake of convenience, that first to fourth doping regions 5311, 5312, 5313 and 5314 are n-type, it is to be noted that the first to fourth doping regions 5311, 5312, 5313 and 5314 are not limited to n-type.

In the region on the substrate 5111 between the first and second doping regions 5311 and 5312, a plurality of dielectric materials 5112 that extend in the first direction may be sequentially provided in the second direction. For example, the dielectric materials 5112 and the substrate 5111 may be provided to be separated from one another by a predetermined distance in the second direction. For example, the dielectric materials 5112 may be separated from one another by a predetermined distance in the second direction. For example, the dielectric materials 5112 may include a dielectric material such as a silicon oxide.

In the region on the substrate 5111 between the first and second doping regions 5311 and 5312, a plurality of pillars 5113 which are sequentially disposed in the first direction and pass through the dielectric materials 5112 in the second direction may be provided. For example, the pillars 5113 may respectively pass through the dielectric materials 5112 and may be electrically coupled with the substrate 5111. For example, each pillar 5113 may be configured by a plurality of materials. For example, a surface layer 5114 of each pillar 5113 may include a silicon material doped into the first type. For example, the surface layer 5114 of each pillar 5113 may include a silicon material doped in with the same type of impurity as the substrate 5111. While it is assumed in that the surface layer 5114 of each pillar 5113 includes p-type silicon, it is to be noted that the surface layer 5114 of each pillar 5113 is not limited to p-type silicon.

An internal layer 5115 of each pillar 5113 may be configured by a dielectric material. For example, the internal layer 5115 of each pillar 5113 may be filled by a dielectric material such as silicon oxide.

In the region between the first and second doping regions 5311 and 5312, a dielectric layer 5116 may be provided on the exposed surfaces of the dielectric materials 5112, the pillars 5113 and the substrate 5111. For example, the thickness of the dielectric layer 5116 may be smaller than ½ of the distance between the dielectric materials 5112. In other words, a region in which a material other than the dielectric material 5112 and the dielectric layer 5116 may be disposed may be provided between the dielectric layer 5116 provided on the bottom surface of a first dielectric material 5112, among the dielectric materials 5112, and the dielectric layer 5116 provided on the top surface of a second dielectric material 5112, among the dielectric materials 5112, which lies below the first dielectric material 5112.

In the region between the first and second doping regions 5311 and 5312, conductive materials 5211, 5221, 5231, 5241, 5251, 5261, 5271, 5281 and 5291 may be provided on the exposed surface of the dielectric layer 5116. For example, the conductive material 5211 which extends in the first direction may be provided between the dielectric material 5112, adjacent to the substrate 5111, and the substrate 5111. In particular, the conductive material 5211 which extends in the first direction may be provided between the dielectric layer 5116 on the bottom surface of the dielectric material 5112, adjacent to the substrate 5111, and the dielectric layer 5116 on the substrate 5111.

The conductive material which extends in the first direction may be provided between the dielectric layer 5116 on the top surface of a certain dielectric material 5112, among the dielectric materials 5112, and the dielectric layer 5116 on the bottom surface of another dielectric material 5112, among the dielectric materials 5112, which is disposed over the certain dielectric material 5112. For example, the conductive materials 5221, 5231, 5241, 5251, 5261, 5271 and 5281 which extend in the first direction may be provided between the dielectric materials 5112. The conductive material 5291 which extends in the first direction may be provided over the uppermost dielectric material 5112. For example, the conductive materials 5211, 5221, 5231, 5241, 5251, 5261, 5271, 5281 and 5291 which extend in the first direction may be a metallic material. For example, the conductive materials 5211, 5221, 5231, 5241, 5251, 5261, 5271, 5281 and 5291 which extend in the first direction may be a conductive material such as polysilicon.

In the region between the second and third doping regions 5312 and 5313, the same structures as the structures on the first and second doping regions 5311 and 5312 may be provided. For example, in the region between the second and third doping regions 5312 and 5313, a plurality of dielectric materials 5112 which extend in the first direction, a plurality of pillars 5113 which are sequentially disposed in the first direction and pass through the dielectric materials 5112 in the second direction, a dielectric layer 5116 which is provided on the exposed surfaces of the dielectric materials 5112 and the pillars 5113, and a plurality of conductive materials 5212, 5222, 5232, 5242, 5252, 5262, 5272, 5282 and 5292 which extend in the first direction may be provided.

In the region between the third and fourth doping regions 5313 and 5314, the same structures as the structures on the first and second doping regions 5311 and 5312 may be provided. For example, in the region between the third and fourth doping regions 5313 and 5314, a plurality of dielectric materials 5112 which extend in the first direction, a plurality of pillars 5113 which are sequentially disposed in the first direction and pass through the dielectric materials 5112 in the second direction, a dielectric layer 5116 which is provided on the exposed surfaces of the dielectric materials 5112 and the pillars 5113, and a plurality of conductive materials 5213, 5223, 5233, 5243, 5253, 5263, 5273, 5283 and 5293 which extend in the first direction may be provided.

Drains 5320 may be respectively provided on the pillars 5113. For example, the drains 5320 may be silicon materials doped with a second type of impurity. For example, the drains 5320 may be silicon materials doped with n-type impurities. While it is assumed in the following, for the sake of convenience, that the drains 5320 include n-type silicon, it is to be noted that the drains 5320 are not limited to n-type silicon. For example, the width of each drain 5320 may be larger than the width of each corresponding pillar 5113. For example, each drain 5320 may be provided in the shape of a pad on the top surface of each corresponding pillar 5113.

Conductive materials 5331, 5332 and 5333 which extend in the third direction may be provided on the drains 5320. The conductive materials 5331, 5332 and 5333 may be sequentially disposed in the first direction. The respective conductive materials 5331, 5332 and 5333 may be electrically coupled with the drains 5320 of corresponding regions. For example, the drains 5320 and the conductive materials 5331, 5332 and 5333, which extend in the third direction, may be electrically coupled with each other through contact plugs. For example, the conductive materials 5331, 5332 and 5333, which extend in the third direction, may be a metallic material. For example, the conductive materials 5331, 5332 and 5333, which extend in the third direction, may be a conductive material such as polysilicon.

In FIGS. 5 and 6, the respective pillars 5113 may form strings together with adjacent regions of the dielectric layer 5116 and adjacent regions of the pluralities of conductive materials 5211 to 5291, 5212 to 5292 and 5213 to 5293, which extend in the first direction. For example, the respective pillars 5113 may form NAND strings NS together with adjacent regions of the dielectric layer 5116 and adjacent regions of the pluralities of conductive materials 5211 to 5291, 5212 to 5292 and 5213 to 5293, which extend in the first direction. Each NAND string NS may include a plurality of transistor structures TS.

Figure 7:
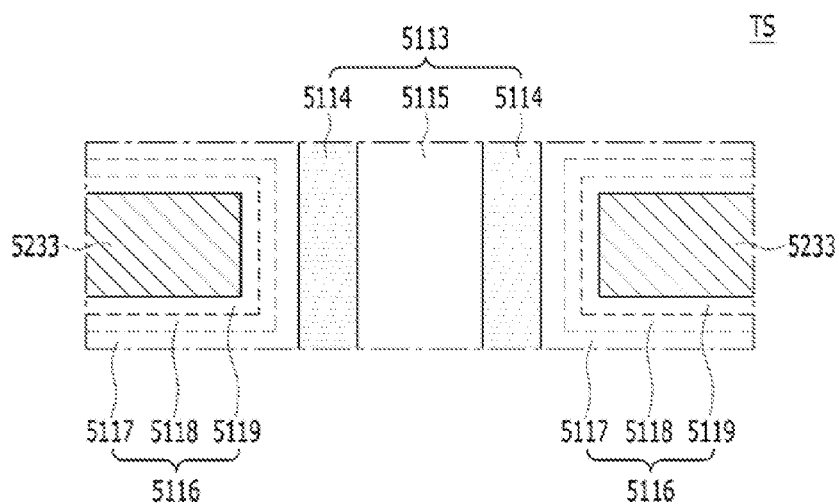

Referring to FIG. 7, in the transistor structure TS shown in FIG. 6, the dielectric layer 5116 may include first to third sub dielectric layers 5117, 5118 and 5119. FIG. 7 is a detailed cross-sectional view of the transistor structure TS shown in FIG. 6.

The p-type silicon 5114 of the pillar 5113 may operate as a body. The first sub dielectric layer 5117 adjacent to the pillar 5113 may operate as a tunneling dielectric layer, and may include a thermal oxidation layer.

The second sub dielectric layer 5118 may operate as a charge storing layer. For example, the second sub dielectric layer 5118 may operate as a charge capturing layer, and may include a nitride layer or a metal oxide layer (e.g., an aluminum oxide layer, a hafnium oxide layer, or the like).

The third sub dielectric layer 5119, adjacent to the conductive material 5233, may operate as a blocking dielectric layer. For example, the third sub dielectric layer 5119, adjacent to the conductive material 5233 which extends in the first direction, may be formed as a single layer or multiple layers. The third sub dielectric layer 5119 may be a high-k dielectric layer (e.g., an aluminum oxide layer, a hafnium oxide layer, or the like), which has a dielectric constant higher than the first and second sub dielectric layers 5117 and 5118.

The conductive material 5233 may operate as a gate (or a control gate). That is to say, the gate for the control gate) 5233, the blocking dielectric layer 5119, the charge storing layer 5118, the tunneling dielectric layer 5117, and the body 5114 may form a transistor (or a memory cell transistor structure). For example, the first to third sub dielectric layers 5117, 5118 and 5119 may form an ONO (oxide-nitride-oxide) structure. In the following, for the sake of convenience, the p-type silicon 5114 of the pillar 5113 will be referred to as a body in the second direction.

The memory block BLKi may include the pillars 5113. Namely, the memory block BLKi may include a plurality of NAND strings NS. In detail, the memory block BLKi may include a plurality of NAND strings NS which extend in the second direction (or a direction perpendicular to the substrate 5111).

Each NAND string NS may include a plurality of transistor structures TS which are disposed in the second direction. At least one of the transistor structures TS of each NAND string NS may operate as a source select transistor SST. At least one of the transistor structures TS of each NAND string NS may operate as a ground select transistor GST.

Gates (or control gates) may correspond to the conductive materials 5211 to 5291, 5212 to 5292 and 5213 to 5293 which extend in the first direction. In other words, the gates (or the control gates) may extend in the first direction and form word lines and at least two select lines, for example, at least one source select line SSL and at least one ground select line GSL.

The conductive materials 5331, 5332 and 5333 which extend in the third direction may be electrically coupled to one ends of the NAND strings NS. For example, the conductive materials 5331, 5332 and 5333 which extend in the third direction may operate as bit lines BL. That is to say, in one memory block BLKi, a plurality of NAND strings NS may be electrically coupled to one bit line BL.

The second type doping regions 5311, 5312, 5313 and 5314, which extend in the first direction, may be provided to the other ends of the NAND strings NS. The second type doping regions 5311, 5312, 5313 and 5314, which extend in the first direction, may operate as common source lines CSL.

Namely, the memory block BLKi includes a plurality of NAND strings NS which extend in the direction perpendicular to the substrate 5111 (i.e. the second direction), and may operate as a NAND flash memory block (e.g., of a charge capturing type) in which a plurality of NAND strings NS are electrically coupled to one bit line BL.

While it is illustrated in FIGS. 5 to 7 that the conductive materials 5211 to 5291, 5212 to 5292 and 5213 to 5293 which extend in the first direction are provided in 9 layers it is to be noted that the conductive materials 5211 to 5291, 5212 to 5292 and 5213 to 5293 which extend in the first direction are not limited to being provided in 9 layers. For example, conductive materials which extend in the first direction may be provided in 8 layers, 16 layers or a plurality of layers. In other words, in one NAND string NS, the number of transistors may be 8, 16 or more.

While it is illustrated in FIGS. 5 to 7 that 3 NAND strings NS are electrically coupled to one bit line BL, it is to be noted that the embodiment of the present invention is not limited to the fact that 3 NAND strings NS are electrically coupled to one bit line BL. For example, in the memory block BLKi, m number of NAND strings NS may be electrically coupled to one bit line BL. According to the number of NAND strings NS which are electrically coupled to one bit line BL, the number of conductive materials 5211 to 5291, 5212 to 5292 and 5213 to 5293 which extend in the first direction and the number of common source lines 5311, 5312, 5313 and 5314 may be controlled as well.

Further, while it is illustrated in FIGS. 5 to 7 that 3 NAND strings NS are electrically coupled to one conductive material which extends in the first direction, it is to be noted that the embodiment of the present invention is not limited to the fact that 3 NAND strings NS are electrically coupled to one conductive material which extends in the first direction. For example, n number of NAND strings NS may be electrically coupled to one conductive material which extends in the first direction. According to the number of NAND strings NS which are electrically coupled to one conductive material which extends in the first direction, the number of bit lines 5331, 5332 and 5333 may be controlled as well.

Figure 8:
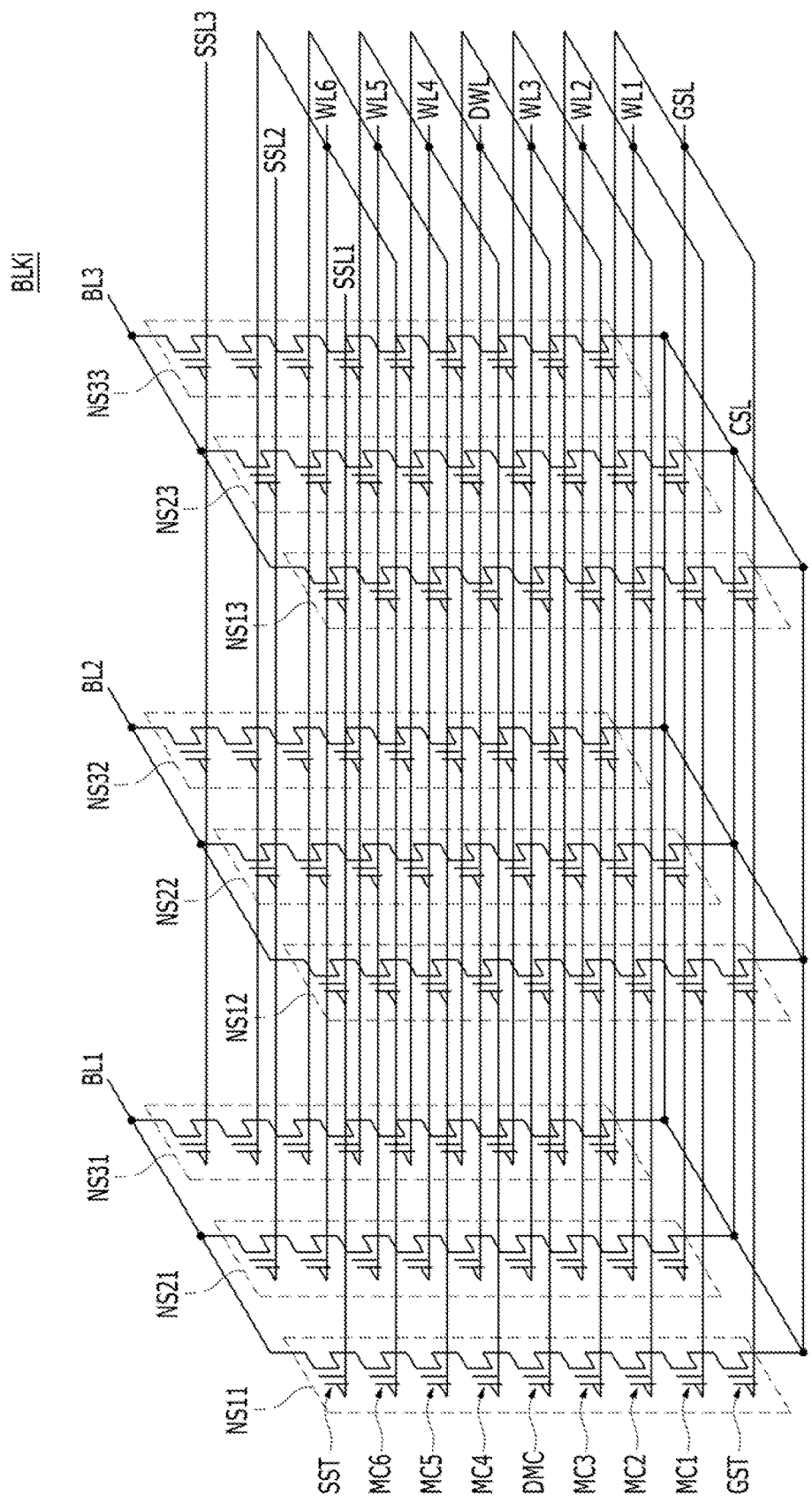

Referring to FIG. 8, in the certain block BLKi which is realized with the first structure, among the blocks of the memory device 150, NAND strings NS11 to NS31 may be provided between a first bit line BL1 and a common source line CSL. FIG. 8 is a circuit diagram illustrating the equivalent circuit of the memory block BLKi which is realized with the first structure as described above with reference to FIGS. 5 to 7. The first bit line BL1 may correspond to the conductive material 5331 which extends in the third direction. NAND strings NS12 to NS32 may be provided between a second bit line BL2 and the common source line CSL. The second bit line BL2 may correspond to the conductive material 5332 which extends in the third direction. NAND strings NS13 to NS33 may be provided between a third bit line BL3 and the common source line CSL. The third bit line BL3 may correspond to the conductive material 5333 which extends in the third direction.

A source select transistor SST of each NAND string NS may be electrically coupled to a corresponding bit line BL. A ground select transistor GST of each NAND string NS may be electrically coupled to the common source line CSL. Memory cells MC may be provided between the source select transistor SST and the ground select transistor GST of each NAND string NS.

In the following, for the sake of convenience, it will be described as an example that NAND strings NS may be defined by the unit of row and column and NAND strings NS which are commonly electrically coupled to one bit line may form one column. For example, the NAND strings NS11 to NS31 which are electrically coupled to the first bit line BL1 may correspond to a first column, the NAND strings NS12 to NS32 which are electrically coupled to the second bit line BL2 may correspond to a second column, and the NAND strings NS13 to NS33 which are electrically coupled to the third bit line BL3 may correspond to a third column. NAND strings NS which are electrically coupled to one source select line SSL may form one row. For example, the NAND strings NS11 to NS13 which are electrically coupled to a first source select line SSL1 may form a first row, the NAND strings NS21 to NS23 which are electrically coupled to a second source select line SSL2 may form a second row, and the NAND strings NS31 to NS33 which are electrically coupled to a third source select line SSL3 may form a third row.

In each NAND string NS, a tier (or height) may be defined. For example, in each NAND string NS, a tier of a memory cell MC1 adjacent to the ground select transistor GST is 1. In each NAND string NS, a tier of a memory cell may increase as the memory cell is close to the source select transistor SST. In each NAND string NS, a tier of a memory cell MC7 adjacent to the source select transistor SST is 7.

The source select transistors SST of the NAND strings NS of the same row may share the source select line SSL. The source select transistors SST of the NAND strings NS of different rows may be respectively electrically coupled to the different source select lines SSL1, SSL2 and SSL3.

The memory cells at the same tier in the NAND strings NS of the same row may share a word line WL. That is to say, at the same tier, the word lines WL electrically coupled to the memory cells MC of the NAND strings NS of different rows may be commonly electrically coupled with one another. Dummy memory cells DMC at the same tier in the NAND strings NS of the same row may share a dummy word line DWL. Namely, at the same tier, the dummy word lines DWL electrically coupled to the dummy memory cells DMC of the NAND strings NS of different rows may be commonly electrically coupled with one another.

For example, word lines WL or dummy word lines DWL may be commonly electrically coupled with one another at layers where the conductive materials 5211 to 5291, 5212 to 5292 and 5213 to 5293, which extend in the first direction, are provided. For example, the conductive materials 5211 to 5291, 5212 to 5292 and 5213 to 5293 which extend in the first direction may be electrically coupled to upper layers through contacts. At upper layers, the conductive materials 5211 to 5291, 5212 to 5292 and 5213 to 5293 which extend in the first direction may be commonly electrically coupled with one another. In other words, the ground select transistors GST of the NAND strings NS of the same row may share the ground select line GSL. Further, the ground select transistors GST of the NAND strings NS of different rows may share the ground select line GSL. That is to say, the NAND strings NS 11 to NS13, NS21 to NS23 and NS31 to NS33 may be commonly electrically coupled to the ground select line GSL.

The common source line CSL may be commonly electrically coupled to the NAND strings NS. For example, on the active regions over the substrate 5111, the first to fourth doping regions 5311, 5312, 5313 and 5314 may be electrically coupled with one another. For example, the first to fourth doping regions 5311, 5312, 5313 and 5314 may be electrically coupled to an upper layer through contacts, and at the upper layer, the first to fourth doping regions 5311, 5312, 5313 and 5314 may be commonly electrically coupled with one another.

Namely, as shown in FIG. 8, the word lines WL of the same depth may be commonly electrically coupled with one another. Accordingly, when a certain word line WL is selected, all NAND strings NS which are electrically coupled to the certain word line WL may be selected. NAND strings NS of different rows may be electrically coupled to different source select lines SSL. Accordingly, by selecting the source select lines SSL1 to SSL3, the NAND strings NS of the rows not selected among the NAND strings NS electrically coupled to the same word line WL may be decoupled from the bit lines BL1 to BL3. In other words, by selecting the source select lines SSL1 to SSL3, the rows of NAND strings NS may be selected. Moreover, by selecting the bit lines BL1 to BL3, the NAND strings NS of selected rows may be selected by the unit of column.

In each NAND string NS, a dummy memory cell DMC may be provided. First to third memory cells MC1 to MC3 may be provided between the dummy memory cell DMC and the ground select transistor GST.

Fourth to sixth memory cells MC4 to MC6 may be provided between the dummy memory cell DMC and the source select transistor SST. The memory cells MC of each NAND string NS may be divided into memory cell groups by the dummy memory cell DMC. In the divided memory cell groups, memory cells, for example, MC1 to MC3, adjacent to the ground select transistor GST, may be referred to as a lower memory cell group, and memory cells, for example, MC4 to MC6, adjacent to the source select transistor SST, may be referred to as an upper memory cell group. Hereinbelow, detailed descriptions will be made with reference to FIGS. 9 to 11, for when the memory device in the memory system in accordance with the embodiment of the present invention is realized as a 3-dimensional nonvolatile memory device of a structure different from the first structure.

Figure 9:
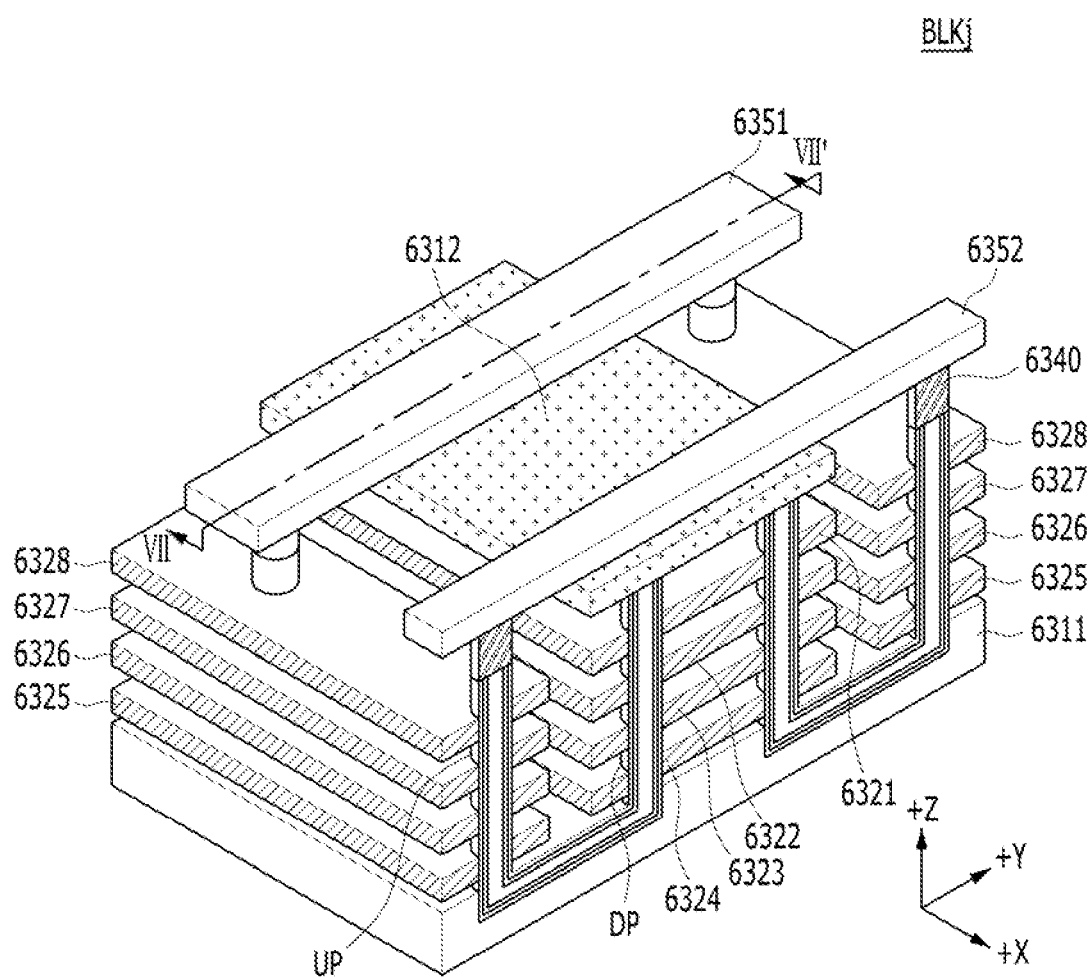
Figure 10:
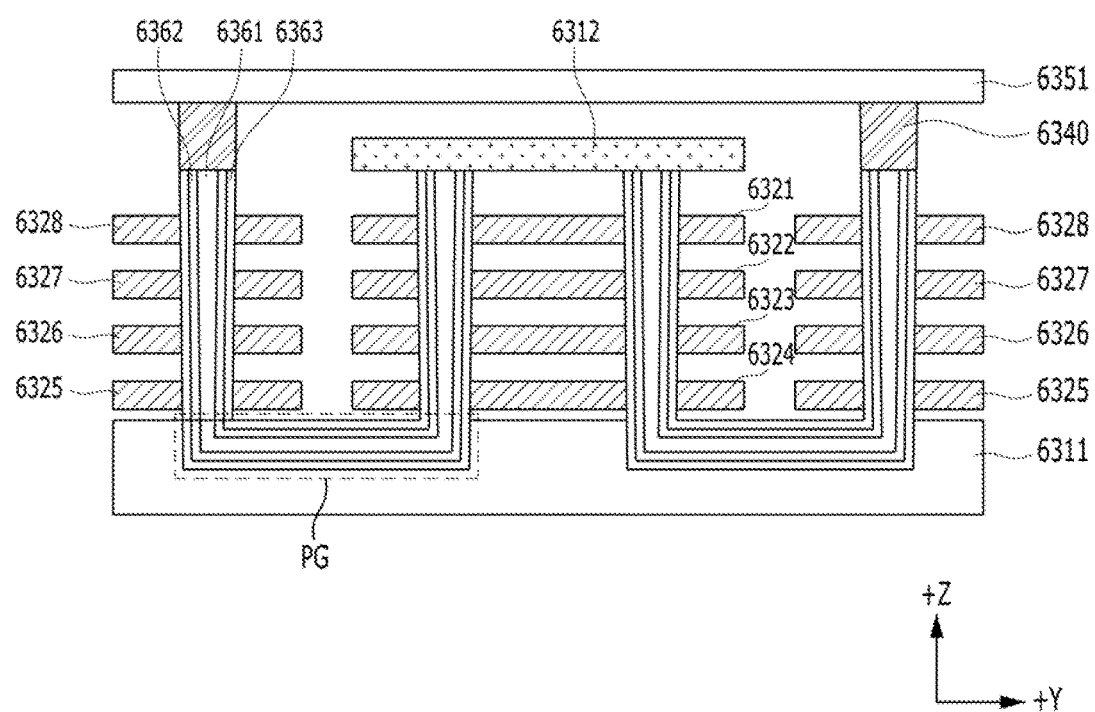

Referring to FIGS. 9 and 10, a certain memory block BLKj among the memory blocks of the memory device 150 may include structures which extend in the first to third directions. FIG. 9 is a perspective view illustrating structures when the memory device in accordance with an embodiment of the present invention is realized as a 3-dimensional nonvolatile memory device of a second structure, different from the first structure described above, with reference to FIGS. 5 to 8 and showing a certain memory block BLKj realized to have the second structure in the memory blocks of FIG. 4. FIG. 10 is a cross-sectional view taken along the line VII-VII' of FIG. 9.

A substrate 6311 may be provided. For example, the substrate 6311 may include a silicon material doped with a first type impurity. For example, the substrate 6311 may include a silicon material doped with a p-type impurity or may be a p-type well e.g., a pocket p-well) and include an n-type well which surrounds the p-type well. While it is assumed in the following, for the sake of convenience, that the substrate 6311 is p-type silicon, it is to be noted that the substrate 6311 is not limited to p-type silicon.

First to fourth conductive materials 6321, 6322, 6323 and 6324 which extend in the x-axis direction and the y-axis direction are provided on the substrate 6311. The first to fourth conductive materials 6321, 6322, 6323 and 6324 are provided to be separated by a predetermined distance in the z-axis direction.

Fifth to eighth conductive materials 6325, 6326, 6327 and 6328 which extend in the x-axis direction and the y-axis direction are provided on the substrate 6311. The fifth to eighth conductive materials 6325, 6326, 6327 and 6328 are provided to be separated by the predetermined distance in the z-axis direction. The fifth to eighth conductive materials 6325, 6326, 6327 and 6328 are provided to be separated from the first to fourth conductive materials 6321, 6322, 6323 and 6324 in the y-axis direction.

A plurality of lower pillars which pass through the first to fourth conductive materials 6321, 6322, 6323 and 6324 are provided. Each lower pillar DP extends in the z-axis direction. Also, a plurality of upper pillars which pass through the fifth to eighth conductive materials 6325, 6326, 6327 and 6328 are provided. Each upper pillar UP extends in the z-axis direction.

Each of the lower pillars DP and the upper pillars UP includes an internal material 6361, an intermediate layer 6362, and a surface layer 6363. As described above with reference to FIGS. 5 and 6, the intermediate layer 6362 operates as the channels of cell transistors. The surface layer 6363 includes a blocking dielectric layer, a charge storing layer, and a tunneling dielectric layer.

The lower pillar DP and the upper pillar UP are electrically coupled through a pipe gate PG. The pipe gate PG may be disposed in the substrate 6311. For instance, the pipe gate PG may include the same material as the lower pillar DP and the upper pillar UP.

A doping material 6312 of a second type which extends in the x-axis direction and the y-axis direction is provided on the lower pillars DP. For example, the doping material 6312 of the second type may include an n-type silicon material. The doping material 6312 of the second type operates as a common source line CSL.

Drains 6340 are provided on the upper pillars UP. For example, the drains 6340 may include an n-type silicon material. First and second upper conductive materials 6351 and 6352 which extend in the y-axis direction are provided on the drains 6340.

The first and second upper conductive materials 6351 and 6352 are provided to be separated in the x-axis direction. For example, the first and second upper conductive materials 6351 and 6352 may be formed of a metal. For instance, the first and second upper conductive materials 6351 and 6352 and the drains 6340 may be electrically coupled with each other through contact plugs. The first and second upper conductive materials 6351 and 6352 respectively operate as first and second bit lines BL1 and BL2.

The first conductive material 6321 operates as a source select line SSL, the second conductive material 6322 operates as a first dummy word line DWL1, and the third and fourth conductive materials 6323 and 6324 operate as first and second main word lines MWL1 and MWL2, respectively. The fifth and sixth conductive materials 6325 and 6326 operate as third and fourth main word lines MWL3 and MWL4, respectively, the seventh conductive material 6327 operates as a second dummy word line DWL2, and the eighth conductive material 6328 operates as a drain select line DSL.

The lower pillar DP and the first to fourth conductive materials 6321, 6322, 6323 and 6324 adjacent to the lower pillar DP form a lower string. The upper pillar UP and the fifth to eighth conductive materials 6325, 6326, 6327 and 6328 adjacent to the upper pillar UP form an upper string. The lower string and the upper string are electrically coupled through the pipe gate PG. One end of the lower string is electrically coupled to the doping material 6312 of the second type which operates as the common source line CSL. One end of the upper string is electrically coupled to a corresponding bit line through the drain 6340. One lower string and one upper string form one cell string which is electrically coupled between the doping material 6312 of the second type and the corresponding bit line.

That is to say, the lower string includes a source select transistor SST, the first dummy memory cell DMC1, and the first and second main memory cells MMC1 and MMC2. The upper string includes the third and fourth main memory cells MMC3 and MMC4, the second dummy memory cell DMC2, and a drain select transistor DST.

In FIGS. 9 and 10, the upper string and the lower string may form a NAND string NS, and the NAND string NS may include a plurality of transistor structures TS. Since the transistor structure included in the NAND string NS in FIGS. 9 and 10 is described above in detail with reference to FIG. 7, a detailed description thereof will be omitted herein.

Figure 11:
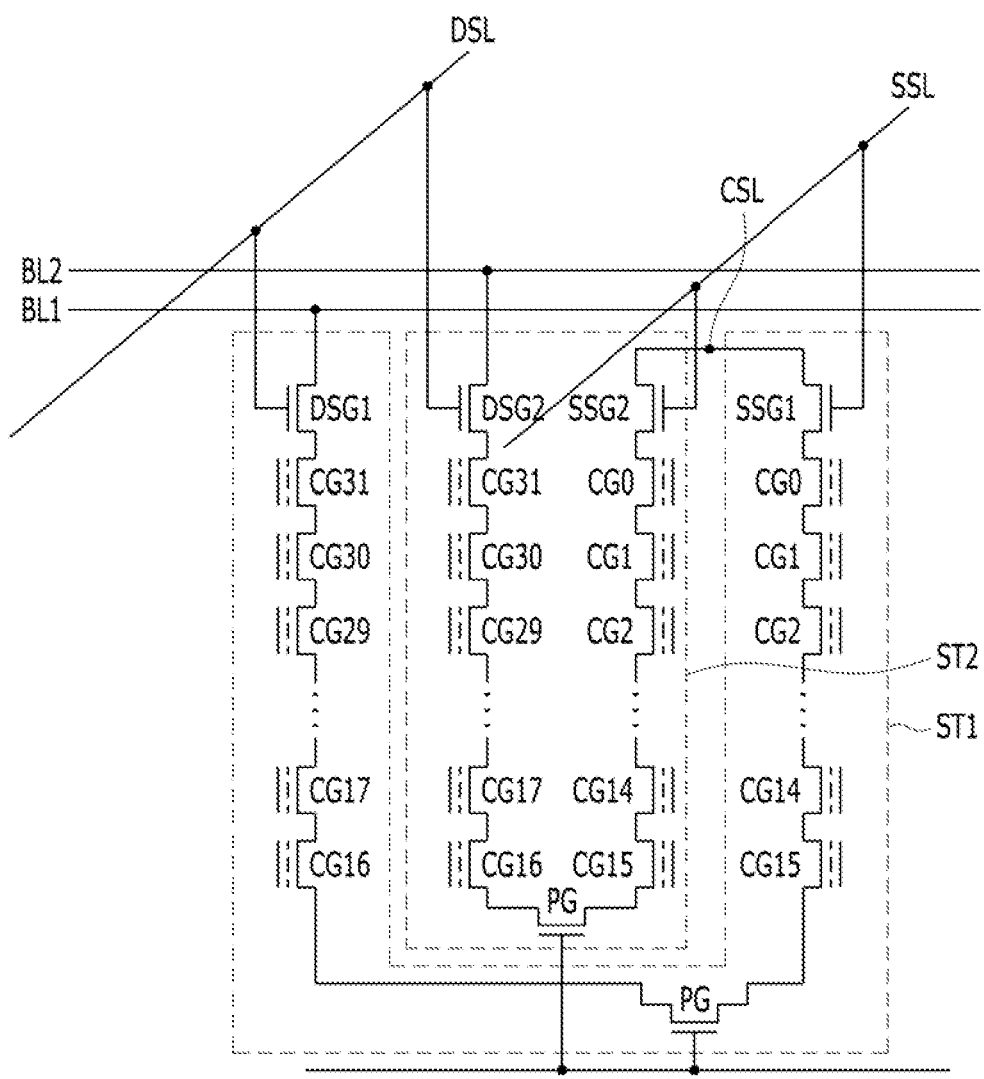

Referring to FIG. 11, in the certain memory block BLKj which is realized with the second structure, among the blocks of the memory device 150, as described above with reference to FIGS. 9 and 10, cell strings, each of which is realized as one upper string and one lower string are electrically coupled through the pipe gate PG, may be provided in such a way as to define a plurality of pairs. FIG. 11 is a detailed diagram of the memory block BLKj which is realized with the second structure as described above with reference to FIGS. 9 and 10, and for the sake of convenience in explanation, only a first string and a second string, which forms a pair in the certain memory block BLKj realized with the second structure, are shown.

Namely in a memory block BLKj which is realized with the second structure, in the memory cells CG0 to CG31 stacked along a first channel, at least one source select gate SSG1 and at least one drain select gate DSG1 may form a first string ST1, and in the memory cells CG0 to CG31 stacked along a second channel, at east one source select gate SSG2 and at least one drain select gate DSG2 may form a second string ST2.

The first string ST1 and the second string ST2 are electrically coupled to the same drain select line DSL and the same source select line SSL. The first string ST1 is electrically coupled to a first bit line BL1, and the second string ST2 is electrically coupled to a second bit line BL2.

While it is described in FIG. 11, for the sake of convenience in explanation, that the first string ST1 and the second string ST2 are electrically coupled to the same drain select line DSL and the same source select line SSL, it may be envisaged that the first string ST1 and the second string ST2 are electrically coupled to the same source select line SSL and the same bit line BL, the first string ST1 is electrically coupled to a first drain select line DSL1 and the second string ST2 is electrically coupled a second drain select line DSL2, or it may be envisaged that the first string ST1 and the second string ST2 are electrically coupled to the same drain select line DSL and the same bit line BL, the first string ST1 is electrically coupled to a first source select line SSL1 and the second string ST2 is electrically coupled to a second source select line SSL2. Hereinbelow detailed descriptions will be made with reference to FIGS. 12 to 15, for power save mode operations for minimizing power consumption in the memory system in accordance with an embodiment of the present invention.

Figure 12:
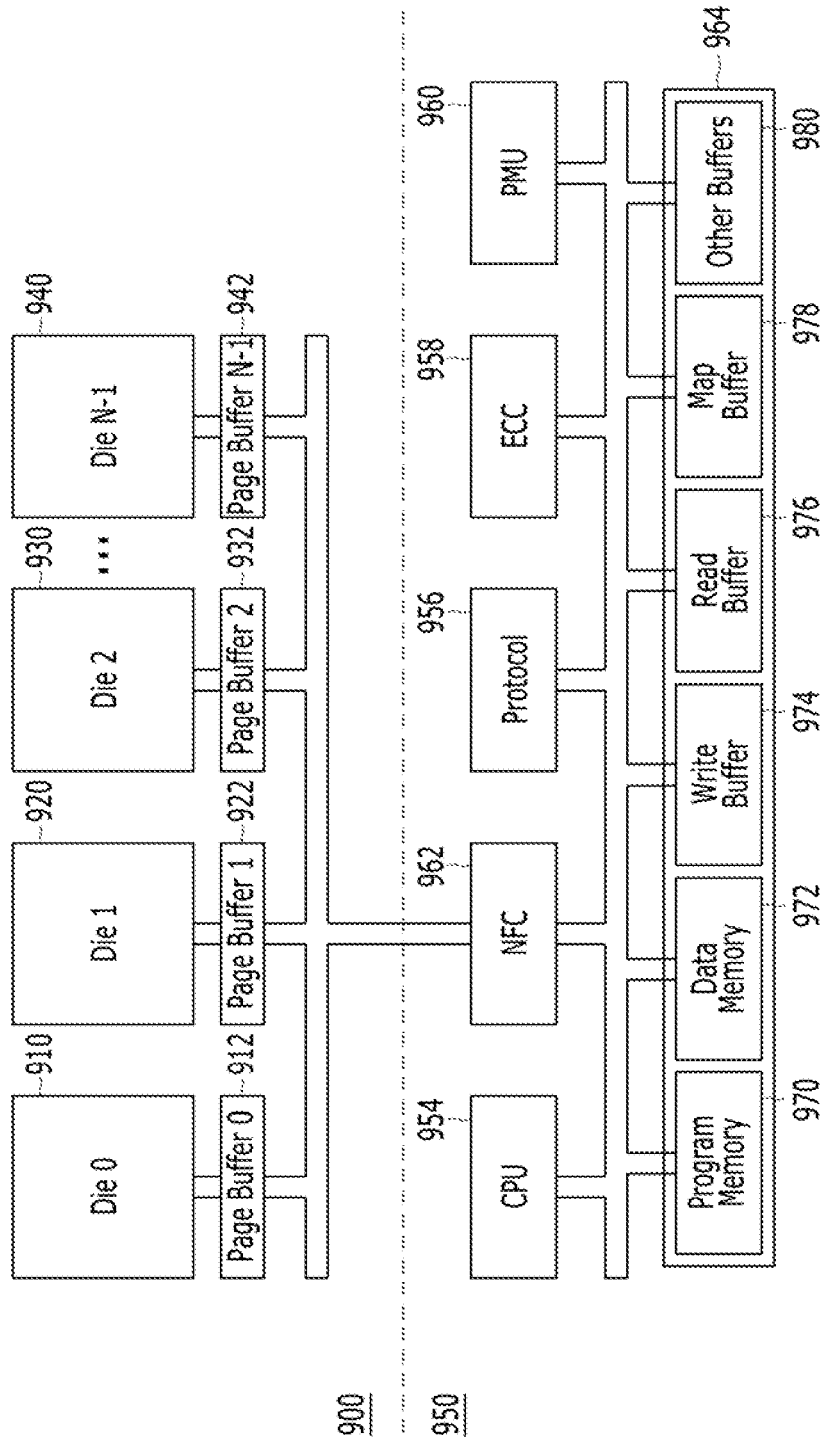
FIGS. 12 to 14 are diagrams for describing power save mode operations for minimizing power consumption in the memory system shown in FIG. 1.
Figure 13:
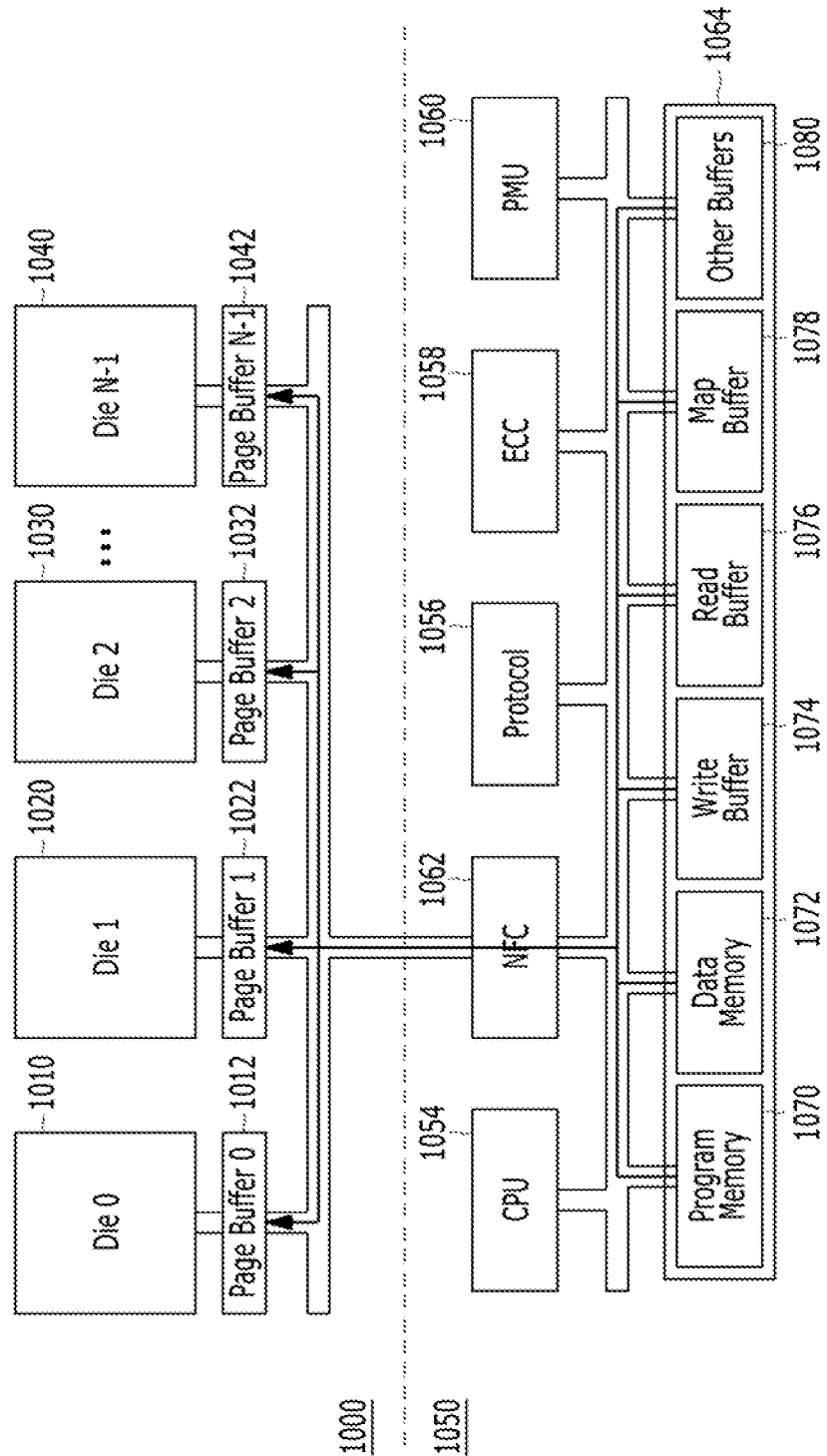
Figure 14:
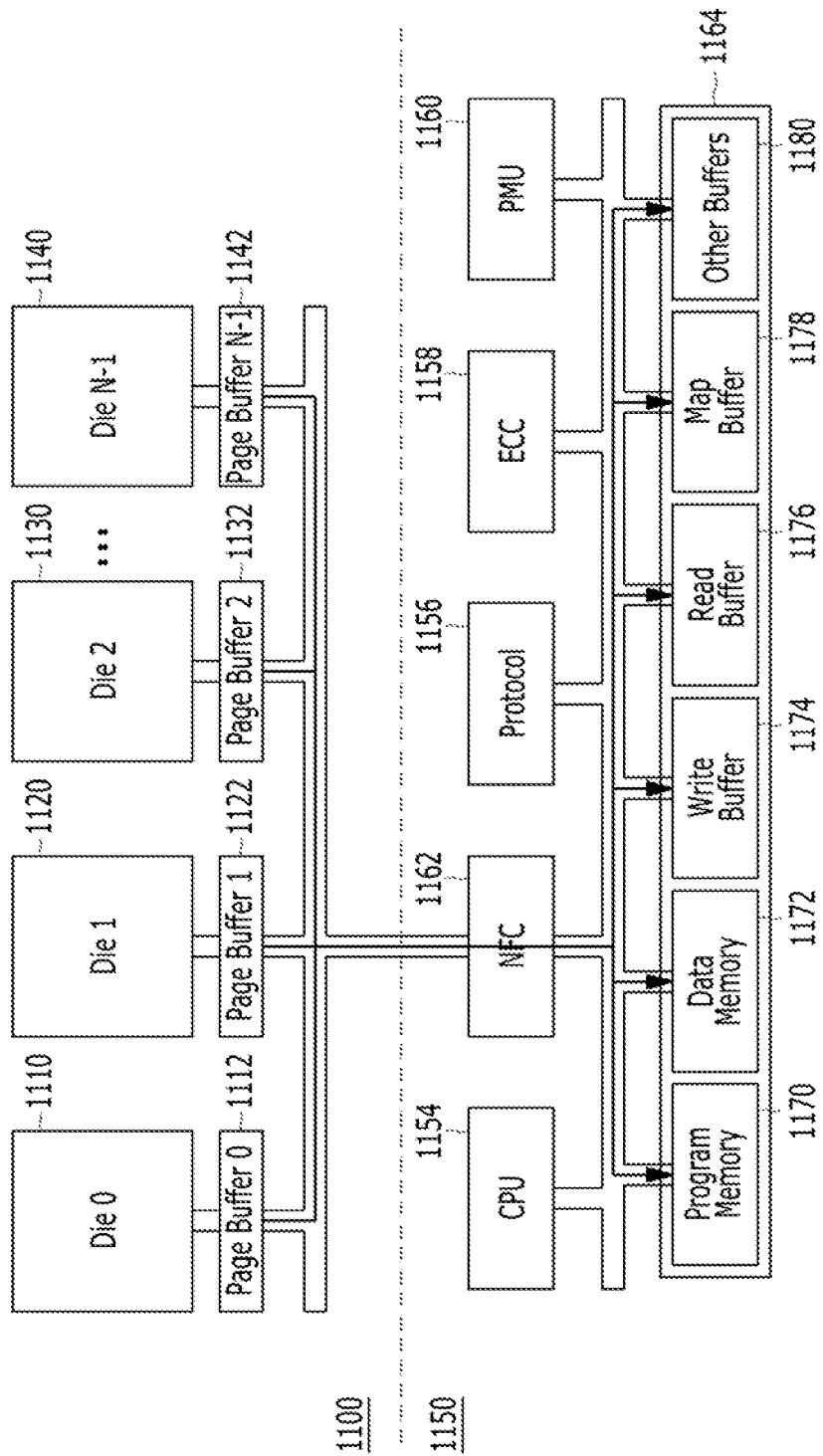

FIGS. 12 to 14 are diagrams for describing power save mode operations for minimizing power consumption in the memory system shown in FIG. 1. In the following, for the sake of convenience in explanation, operations in the memory system 110 in which the memory blocks of the memory device 150, shown in FIG. 2, are formed of N number of memory cells dies will be described as an example. Also, although it will be described as an example in the following, for the sake of convenience in explanation, that the controller 130 performs the power save mode operations in the memory system 110, it is to be noted that, as described above, the processor 134 included in the controller 130 may perform the power save mode operations in the memory system 110.

Referring to FIG. 12, in the same manner as described above, the memory system 110 includes a memory device 900 which includes a plurality of memory blocks, and a controller 950 which controls the operations of the memory device 900.

The memory device 900 includes memory cell dies which realize the memory cells of the respective memory blocks, for example, N number of memory cell dies respectively corresponding to the N number of memory blocks, that is, a zeroth die (Die 0) 910, a first die (Die 1) 920, a second die (Die 2) 930 and an N-1$^{th}$ die (Die N-1) 940, and page buffers which correspond to memory cells, for example, N number of page buffers respectively corresponding to the N number of memory cell dies, that is, a zeroth page buffer (Page Buffer 0) 912, a first page buffer (Page Buffer 1) 922, a second page buffer (Page Buffer 2) 932 and an N-1$^{th}$ page buffer (Page Buffer N-1) 942. That is to say, the respective memory blocks of the memory device 900 include memory cells and page buffers corresponding to the memory cells.

In the same manner as described above, the controller 950 includes a CPU 954 as a processor, an NFC 962, a protocol unit 956, an ECC unit 958, a PMU 960, and a memory 964. The memory 964 may include a program memory 970, a data memory 972, a write buffer 974, a read buffer 976, a map buffer 978, and other buffers 980.

The controller 950 controls the memory device 900 in response to a request from the host 102 when the operation mode of the memory system 110 is a normal mode, for example, an active mode. For example, the controller 950 provides the data read from the memory device 900, to the host 102, and stores the data provided from the host 102, in the memory device 900. To this end, the controller 950 controls the active operations of the memory device 900, such as read, write, program and erase operations.

In the same manner as described above, in the active mode, the memory 964 of the controller 950 stores the data needed to perform data write and read operations between the host 102 and the memory device 900 and data when performing the data read and write operations. Such data are respectively stored in corresponding memories or buffers, that is, the program memory 970, the data memory 972, the write buffer 974, the read buffer 976, the map buffer 978, and the other buffers 980.

In other words, when the controller 950 controls the memory device 900 in response to a request from the host 102 in the active mode of the memory system 110, for example, when the controller 950 provides the data read from the memory device 900, to the host 102, and stores the data provided from the host 102, in the memory device 900, and, to this end, when the controller 950 controls the operations of the memory device 900, such as read, write program and erase operations, the program memory 970, the data memory 972, the write buffer 974, the read buffer 976, the map buffer 978 and the other buffers 980 store the data needed to allow such operations to be performed by the memory system 110, that is, between the controller 950 and the memory device 900.

In order to minimize the power consumption of the memory system 110, the operation mode of the memory system 110 is changed from a normal mode, for example, an active mode, to a power save mode, for example, a sleep mode or a power-down mode. The change of the operation mode of the memory system 110, for example, the change from the normal mode to the power save mode, that is, the change from the active mode to the sleep mode or the power-down mode, is performed by receiving an operation mode change command from the host 102, or is performed when it is detected through a timer (not shown) included in the memory system 110 that an active operation such as read, write, program and erase operations is not performed in the memory system 110 for a predetermined time.

In detail, if the memory system 110 receives an operation mode change command to the sleep mode or the power-down mode from the host 102 while performing an active operation such as read, write, program and erase operations in the normal mode, that is, the active mode, the controller 950 changes the operation mode of the memory system 110 from the active mode to the power save mode, that is, the sleep mode or the power-down mode. Also, when the memory system 110 does not perform an active operation such as read, write, program and erase operations for the predetermined time in the active mode, the controller 950 changes the operation mode of the memory system 110 from the active mode to the sleep mode or the power-down mode. In this regard, when the memory system 110 does not perform an active operation such as read, write, program and erase operations for the predetermined time in the active mode, the controller 950 may change the operation mode of the memory system 110 from the active mode to the sleep mode and, then, when an active operation such as read, write, program and erase operations is not performed for the predetermined time in the active mode, the controller 950 may change the operation mode of the memory system 110 from the sleep mode to the power-down mode.

In the case where the memory system 110 receives an operation mode change command to the active mode from the host 102 in the sleep mode or the power-down mode, or in the case where it is detected that the memory system 110 performs an active operation such as read, write, program and erase operations, the controller 950 changes the operation mode of the memory system 110 from the sleep mode or the power-down mode to the active mode. Hereinbelow, operation mode changes in the memory system in accordance with the embodiment of the present invention will be described in detail with reference to FIGS. 13 and 14.

Referring to FIG. 13, when an operation mode change command to a sleep mode or a power-down mode is received from the host 102 in an active mode of the memory system 110 or when an active operation such as read, write, program and erase operations is not performed for a predetermined time, a controller 1050 changes the operation mode of the memory system 110 from the active mode to the sleep mode or the power-down mode.

Before making a change from the active mode to the sleep mode or the power-down mode, the controller 1050 stores the data stored in a memory 1064 of the controller 1050, in page buffers 1012, 1022, 1032 and 1042 which are included in the respective memory blocks of a memory device 1000.

In detail, before changing the operation mode of the memory system 110 from the active mode to the sleep mode or the power-down mode, the controller 1050 backs up and stores the data stored in a program memory 1070, a data memory 1072, a write buffer 1074, a read buffer 1076, a map buffer 1078 and other buffers 1080 which are included in the memory 1064 of the controller 1050, in the page buffers which are included in the respective memory blocks of the memory device 1000, that is, N number of page buffers 1012, 1022, 1032 and 1042 corresponding to N number of memory cell dies 1010, 1020, 1030 and 1040. In the following, for the sake of convenience in explanation, in the memory 1064 of the controller 1050, the data stored in the program memory 1070 will be referred to as first data, the data stored in the data memory 1072 will be referred to as second data, the data stored in the write buffer 1074 will be referred to as third data, the data stored in the read buffer 1076 will be referred to as fourth data, the data stored in the map buffer 1078 will be referred to as fifth data, and the data stored in the other buffers 1080 will be referred to as sixth data.

Namely, the first data, the second data, the third data, the fourth data, the fifth data and the sixth data of the memory 1064 of the controller 1050 are backed up and stored in the N number of page buffers 1012, 1022, 1032 and 1042 before the change is made from the active mode to the sleep mode or the power-down mode.

The controller 1050 changes the operation mode of the memory system 110 from the active mode to the sleep mode or the power-down mode and, accordingly, the memory system 110 minimizes power consumption, that is, becomes a power gating block, as a CPU 1054, an NFC 1062, a protocol unit 1056, an ECC unit 1058, a PMU 1060 and the memory 1064 of the controller 1050 operate in sleep mode or power-down mode as a power save mode.

The data stored in the program memory 1070, the data memory 1072, the write buffer 1074, the read buffer 1076, the map buffer 1078 and the other buffers 1080, which are included in the memory 1064 of the controller 1050, may be backed up simultaneously in the N number of page buffers 1012, 1022, 1032 and 1042, may be backed up sequentially in the N number of page buffers 1012, 1022, 1032 and 1042 according to preset priorities, or may be backed up sequentially in the N number of page buffers 1012, 1022, 1032 and 1042 according to the priorities included in the operation mode change command received from the host 102.

The priorities of the data stored in the memory 1064 of the controller 1050 are determined in consideration of the uses of the data stored in the memory 1064 of the controller 1050, that is, the uses of the program memory 1070, the data memory 1072, the write buffer 1074, the read buffer 1076, the map buffer 1078 and the other buffers 1080 which are included in the memory 1064 of the controller 1050.

In detail, the priorities of the data stored in the memory 1064 of the controller 1050 are determined in consideration of when to wake-up from sleep mode or power-down mode and the operation mode is changed to active mode. For instance, in consideration of recovery orders of data upon waking up, the priorities of the data stored in the program memory 1070, the data memory 1072, the write buffer 1074, the read buffer 1076, the map buffer 1078 and the other buffers 1080 are determined. For example, the priorities of the data stored in the memory 1064 of the controller 1050 may be determined such that the data stored in the program memory 1070 and the data memory 1072 have a highest priority to minimize wake-up time to change the operation mode from the sleep mode or the power-down mode to the active mode. Further, the priorities of the data stored in the memory 1064 of the controller 1050 may be determined such that the data stared in the map buffer 1078 have the next highest priority to allow quick loading of map information after waking-up from sleep mode or power-down mode to the active mode such that the data stored in the write buffer 1074 and the read buffer 1076 have a next priority to cache data after waking-up from the sleep mode or the power-down mode to the active mode.

In other words, according to the uses of the data stored in the memory 1064 of the controller 1050, considering when a wake-up is to be made from the sleep mode or the power-down mode and a change is to be made to the active mode, the priorities of the data stored in the memory 1064 of the controller 1050 are determined in the order of the data stored in the program memory 1070 and the data memory 1072, the data stored in the map buffer 1078, and the data stored in the write buffer 1074 and the read buffer 1076, that is, the first data and the second data have the highest priority, the fifth data have the next highest priority, and the third data and the fourth data have the priority next to the fifth data. According to such priorities, the data stored in the memory 1064 of the controller 1050 are backed up and stored sequentially in the N number of page buffers 1012, 1022, 1032 and 1042.

Also, the priorities of the data stored in the memory 1064 of the controller 1050 are determined in consideration of the power consumption amount of the memory 1064 of the controller 1050 in the active mode, that is, the power consumption amounts of the program memory 1070, the data memory 1072, the write buffer 1074, the read buffer 1076, the map buffer 1078 and the other buffers 1080 which are included in the memory 1064 of the controller 1050.

In detail, the priorities of the data stored in the memory 1064 of the controller 1050 may be determined such that the data stored in the program memory 1070 and the data memory 1072 have a highest priority when the program memory 1070 and the data memory 1072 have maximum power consumption. Further, the priorities of the data stored in the memory 1064 of the controller 1050 may be determined such that the data stored in the map buffer 1078 have a next higher priority when the map buffer 1078 has a next larger power consumption amount and such that the data stored in the write buffer 1074 and the read buffer 1076 have a next priority when the write buffer 1074 and the read buffer 1076 have a next power consumption amount.

Namely, in the active mode of the memory system 110, in consideration of the power consumption amounts of the program memory 1070, the data memory 1072, the write buffer 1074, the read buffer 1076, the map buffer 1078 and the other buffers 1080 which are included in the memory 1064 of the controller 1050, the priorities of the data stored in the memory 1064 of the controller 1050 are determined in the order of the data stored in the program memory 1070 and the data memory 1072, the data stored in the map buffer 1078, and the data stored in the write buffer 1074 and the read buffer 1076, that is, the first data and the second data have the highest priority, the fifth data have the next higher priority, and the third data and the fourth data have priority next to the fifth data. According to such priorities, the data stored in the memory 1064 of the controller 1050 are backed up and stored sequentially in the N number of page buffers 1012, 1022, 1032 and 1042.

Moreover, the priorities of the data stored in the memory 1064 of the controller 1050 are determined in consideration of the size of the data stored in the memory 1064 of the controller 1050, that is, the sizes of the data respectively stored in the program memory 1070, the data memory 1072, the write buffer 1074, the read buffer 1076, the map buffer 1078 and the other buffers 1080 which are included in the memory 1064 of the controller 1050.

In detail, the priorities of the data stored in the memory 1064 of the controller 1050 may be determined such that the data stored in the program memory 1070 and the data memory 1072 have a highest priority when the data stored in the program memory 1070 and the data memory 1072 have a maximum size. Further, the priorities of the data stored in the memory 1064 of the controller 1050 may be determined such that the data stored in the map buffer 1078 have a next higher priority in when the data stored in the map buffer 1078 have a next largest size and such that the data stored in the write buffer 1074 and the read buffer 1076 have a next priority when the data stored in the write buffer 1074 and the read buffer 1076 have a next size.

That is to say, in consideration of the sizes of the data respectively stored in the program memory 1070, the data memory 1072, the write buffer 1074, the read buffer 1076, the map buffer 1078 and the other buffers 1080 which are included in the memory 1064 of the controller 1050, the priorities of the data stored in the memory 1064 of the controller 1050 are determined in the order of the data stored in the program memory 1070 and the data memory 1072, the data stored in the map buffer 1078, and the data stored in the write buffer 1074 and the read buffer 1076, that is, the first data and the second data have the highest priority, the fifth data have the next higher priority, and the third data and the fourth data have the priority next to the fifth data. According to such priorities, the data stored in the memory 1064 of the controller 1050 are backed up and stored sequentially in the N number of page buffers 1012, 1022, 1032 and 1042.

In addition, the priorities of the data stored in the memory 1064 of the controller 1050 are determined in consideration of the latency of the data stored in the memory 1064 of the controller 1050. In other words, the priorities of the data stored in the memory 1064 of the controller 1050 are determined in consideration of latencies when the data respectively stored in the program memory 1070, the data memory 1072, the write buffer 1074, the read buffer 1076, the map buffer 1078 and the other buffers 1080, which are included in the memory 1064 of the controller 1050, are backed up in the N number of page buffers 1012, 1022, 1032 and 1042 or in consideration of latencies when the data backed up in the N number of page buffers 1012, 1022, 1032 and 1042 are recovered correspondingly to the program memory 1070, the data memory 1072, the write buffer 1074, the read buffer 1076, the map buffer 1078 and the other buffers 1080 as will be described later with reference to FIG. 14.

In detail, the priorities of the data stored in the memory 1064 of the controller 1050 may be determined such that the data stored in the program memory 1070 and the data memory 1072 have a highest priority when the data stored in the program memory 1070 and the data memory 1072 have a largest latency. Further, the priorities of the data stored in the memory 1064 of the controller 1050 may be determined such that the data stored in the map buffer 1078 have a next highest priority when the data stored in the map buffer 1078 have a next larger latency and such that the data stored in the write buffer 1074 and the read buffer 1076 have a next priority when the data stored in the write buffer 1074 and the read buffer 1076 have a next latency.

Namely, in consideration of the latencies of the data respectively stored in the program memory 1070, the data memory 1072, the write buffer 1074, the read buffer 1076, the map buffer 1078 and the other buffers 1080 which are included in the memory 1064 of the controller 1050, the priorities of the data stored in the memory 1064 of the controller 1050 are determined in the order of the data stored in the program memory 1070 and the data memory 1072, the data stored in the map buffer 1078, and the data stored in the write buffer 1074 and the read buffer 1076, that is, the first data and the second data have the highest priority, the fifth data have the next highest priority and the third data and the fourth data have the priority next to the fifth data. According to such priorities, the data stored in the memory 1064 of the controller 1050 are backed up and stored sequentially in the N number of page buffers 1012, 1022, 1032 and 1042.

Information indicating that the data stored in the memory 1064 of the controller 1050 are backed up and stored in the N number of page buffers 1012, 1022, 1032 and 1042, that is, data storage information is recorded and stored in the register included in the PMU 1060 of the controller 1050 or is recorded and stored in the register included in the program memory 1070 of the controller 1050. When the data storage information is recorded and stored in the register included in the program memory 1070 of the controller 1050, even though the program memory 1070 of the controller 1050 operates in the power save mode by operating in the sleep mode or the power-down mode, the register included in the program memory 1070 of the controller 1050 retains a power-on state in the sleep mode or the power-down mode.

The data storage information includes information that indicates the data stored in corresponding memories and buffers, that is, the program memory 1070, the data memory 1072, the write buffer 1074, the read buffer 1076, the map buffer 1078 and the other buffers 1080, in which the first data to the sixth data are stored, and information that indicates corresponding page buffers in which the first to sixth data are backed up.

In this way, after the data stored in the memory 1064 of the controller 1050 are backed up and stored in the page buffers 1012, 1022, 1032 and 1042 before the change is made from the active mode to the sleep mode or the power-down mode, when the data storage information indicating that the data stored in the memory 1064 of the controller 1050 are backed and stored in the page buffers 1012, 1022, 1032 and 1042 is recorded and stored in the register of the controller 1050, that is, is recorded and stored in the register of the PMU 1060 or the program memory 1070 of the controller 1050, the controller 1050 changes the operation mode of the memory system 110 from the active mode to the sleep mode or the power-down mode and minimizes power consumption.

Referring to FIG. 14, a controller 1150 changes the operation mode of the memory system 110 from a sleep mode or a power-down mode to an active mode when an operation mode change command to the active mode is received from the host 102 when it is detected that the memory system 110 performs an active operation such as read, write, program and erase operations, in the sleep mode or the power-down mode of the memory system 110.

When changing the operation mode of the memory system 110 to the active mode by waking-up from the sleep mode or the power-down mode, after identifying the wake-up from the sleep mode or the power-down mode, the controller 1150 recovers the data backed up and stored in page buffers 1112, 1122, 1132 and 1142 included in the respective memory blocks of a memory device 1100 before making a change from the active mode to the sleep mode or the power-down mode as described above with reference to FIG. 13, to a memory 1164 of the controller 1150.

In detail, if the wake-up of the memory system 110 from the sleep mode or the power-down mode is identified, before making a change from the active mode to the sleep mode or the power-down mode, the controller 1150 recovers the data backed up and stored in the page buffers included in the respective memory blocks of the memory device 1100, that is, N number of page buffers 1112, 1122, 1132 and 1142 corresponding to N number of memory cell dies 1110, 1120, 1130 and 1140, that is data respectively corresponding to a program memory 1170, a data memory 1172, a write buffer 1174, a read buffer 1176, a map buffer 1178 and other buffers 1180 which are included in the memory 1164 of the controller 1150, to the program memory 1170, the data memory 1172, the write buffer 1174, the read buffer 1176, the map buffer 1178 and the other buffers 1180. Since backing up and storing of data respectively corresponding to the program memory 1170, the data memory 1172, the write buffer 1174, the read buffer 1176, the map buffer 1178 and the other buffers 1180 which are included in the memory 1164 of the controller 1150, in the N number of page buffers 1112, 1122, 1132 and 1142, before the change from the active mode to the sleep mode or the power-down mode is made, is described above in detail with reference to 13, detailed descriptions thereof will be omitted herein.

After identifying the corresponding page buffers 1112, 1122, 1132 and 1142 in which the data respectively corresponding to the program memory 1170, the data memory 1172, the write buffer 1174, the read buffer 1176, the map buffer 1178 and the other buffers 1180 are backed up and stored, by identifying the data storage information recorded and stored in the register of the controller 1150, that is, recorded and stored in the register of a PMU 1160 or the program memory 1170 of the controller 1150, the controller 1150 recovers the data backed up and stored in the corresponding page buffers 1112, 1122, 1132 and 1142, to the program memory 1170, the data memory 1172, the write buffer 1174, the read buffer 1176, the map buffer 1178 and the other buffers 1180.

The data backed up and stored in the corresponding page buffers 1112, 1122, 1132 and 1142 are recovered to the program memory 1170, the data memory 1172, the write buffer 1174, the read buffer 1176, the map buffer 1178 and the other buffers 1180 which are included in the memory 1164 of the controller 1150, based on the backup and storage of the data in the corresponding page buffers 1112, 1122, 1132 and 1142 as described above with reference to FIG. 13 before the operation mode of the memory system 110 is changed from the active mode to the sleep mode or the power-down mode.

That is to say, the data backed up and stored in the corresponding page buffers 1112, 1122, 1132 and 1142 may be recovered simultaneously to the corresponding program memory 1170, data memory 1172, write buffer 1174, read buffer 1176, map buffer 1178 and other buffers 1180, may be recovered sequentially to the corresponding program memory 1170, data memory 1172, write buffer 1174, read buffer 1176, map buffer 1178 and other buffers 1180 according to preset priorities, or may be recovered sequentially to the corresponding program memory 1170, data memory 1172, write buffer 1174, read buffer 1176, map buffer 1178 and other buffers 1180 according to the priorities included in the operation mode change command received from the host 102, in the same manner as described above with reference to FIG. 13. For reference, the priorities may be received when the operation mode change command is received from the host 102.

The priorities of the data backed up and stored in the corresponding page buffers 1112, 1122, 1132 and 1142 are determined based on the priorities of the data stored in the program memory 1170, the data memory 1172, the write buffer 1174, the read buffer 1176, the map buffer 1178 and the other buffers 1180 when the data stored in the program memory 1170, the data memory 1172, the write buffer 1174, the read buffer 1176, the map buffer 1178 and the other buffers 1180 are backed up and stored in the corresponding page buffers 1112, 1122, 1132 and 1142 in the same manner as described above with reference to FIG. 13. For example, the priorities of the data backed up and stored in the corresponding page buffers 1112, 1122, 1132 and 1142 are determined based on the uses, sizes or latencies of the data to be recovered to the program memory 1170, the data memory 1172, the write buffer 1174, the read buffer 1176, the map buffer 1178 and the other buffers 1180 or the power consumption amounts of the program memory 1170, the data memory 1172, the write buffer 1174, the read buffer 1176, the map buffer 1178 and the other buffers 1180. Since the priorities of the data stored in the program memory 1170, the data memory 1172, the write buffer 1174, the read buffer 1176, the map buffer 1178 and the other buffers 1180 have been described above in detail with reference to FIG. 13, detailed descriptions thereof will be omitted herein.

In this way, after identifying the wake-up of the memory system 110 from the sleep mode or the power-down mode, the controller 1150 recovers the data stored in the N number of page buffers 1112, 1122, 1132 and 1142, to the program memory 1170, the data memory 1172, the write buffer 1174, the read buffer 1176, the map buffer 1178 and the other buffers 1180, and then, controls the memory system 110 to normally operate in the active mode, that is, controls the memory system 110 to perform read, write, program and erase operations. When changing the operation mode of the memory system 110 from the power-down mode to the active mode, as the controller 1150 recovers the data corresponding to the program memory 1170 the data memory 1172, the write buffer 1174, the read buffer 1176, the map buffer 1178 and the other buffers 1180, not from the N number of memory cell dies 1110, 1120, 1130 and 1140 but from the N number of page buffers 1112, 1122, 1132 and 1142, data recovery latency may be shortened and, accordingly, the memory system 110 may be quickly changed from the power-down mode to the active mode to perform a normal operation. Hereinbelow, operation mode changes in a memory system in accordance with an embodiment of the present invention will be described in further detail with reference to FIG. 15.

Figure 15:
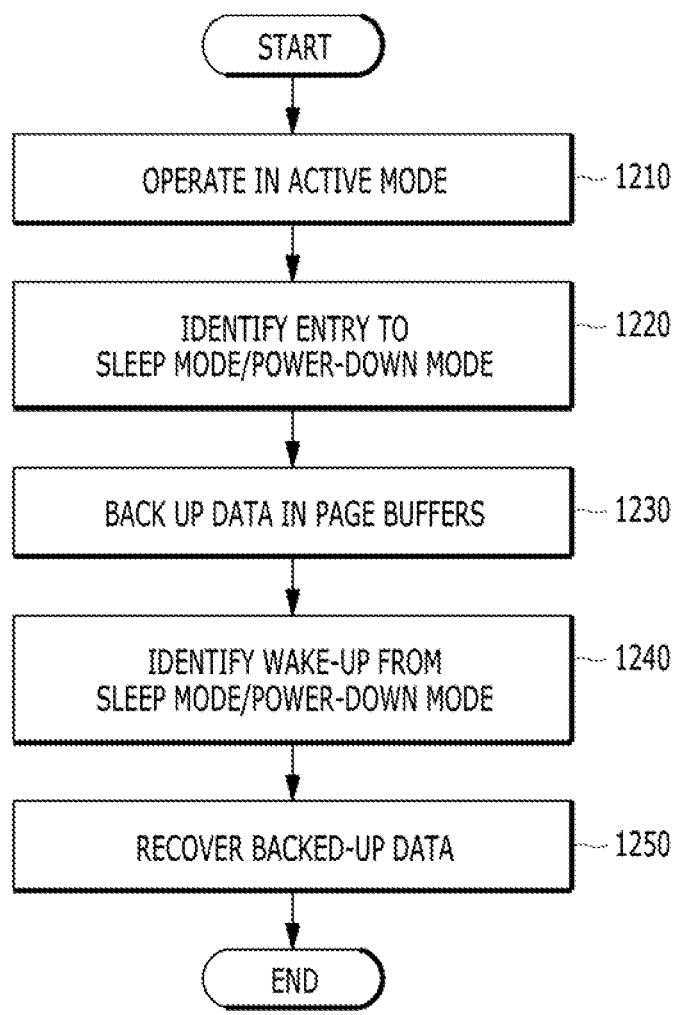
FIG. 15 is a flow chart for describing a process for performing operation mode changes in the memory system shown in FIG. 1.

FIG. 15 is a flow chart for describing a process for performing operation mode changes in the memory system shown in FIG. 1.

Referring to FIG. 15, at step 1210, the memory system 110 performs an active mode operation, that is, an active mode operation such as a read, write, program or erase operation.

At step 1220, while performing the active mode operation, when an operation mode change command to a sleep mode or a power-down mode is received from the host 102 or when an active mode operation such as a read, write, program or erase operation is not performed for a predetermined time, an entry to the sleep mode or the power-down mode from an active mode is identified.

At step 1230, before making a change from the active mode to the sleep mode or the power-down mode, the data stored in the memory of the controller is backed up and stored in the page buffers included in the respective blocks of the memory device. Then, an operation mode is changed from the active mode to the sleep mode or the power-down mode, to minimize the power consumption of the memory system 110.

At step 1240, while minimizing the power consumption of the memory system 110 by operating in the sleep mode or the power-down mode, when an operation mode change command to the active mode is received from the host 102 or when the performance of an active mode operation such as a read, write, program or erase operation is detected, a wake-up from the sleep mode or the power-down mode and a change to the active mode are identified.

At step 1250, before waking up from the sleep mode or the power-down mode and making the change to the active mode, the data backed up and stored in the page buffers included in the respective blocks of the memory device are recovered to the memory of the controller, to control the memory system 110 to normally operate in the active mode, that is, control the memory system 110 to perform a read, write, program or erase operation. Since the operations for operation mode changes in the memory system 110 have been described above in detail with reference to FIGS. 12 to 14, detailed descriptions thereof will be omitted herein.

As is apparent from the above descriptions, the memory system and the operating method thereof according to the embodiments of the present invention may minimize power consumption.

Although various embodiments have been described for illustrative purposes, it will be apparent to those skilled in the art that various changes and modifications may be made without departing from the spirit and scope of the invention as defined in the following claims.

What is claimed is:

1. A memory system comprising:
   a memory device including a plurality of blocks and a plurality of page buffers, which respectively correspond to the blocks, wherein each of the blocks includes a plurality of pages in which data is stored; and
   a controller suitable for backing up data stored in a memory included in the controller, not into the blocks but into the page buffers as a final destination for a power save mode when an operation mode is about to change to the power save mode,
   wherein the memory includes a program memory unit, a data memory unit, a map buffer unit, a write buffer unit, and a read buffer unit,
   wherein, before the power save mode begins, the controller backs up the data stored in the memory units and the buffer units, simultaneously or sequentially, in the page buffers based on priorities of the program memory unit, the data memory unit, the map buffer unit, the write buffer unit, and the read buffer unit in order, and
   wherein, when the operation is about to change from the power save mode to the active mode, the controller recovers the data backed up in the page buffers, to the respective corresponding memory units and buffer units.

2. The memory system according to claim 1, wherein the controller recovers the data backed up in the page buffers, to the memory, when the operation mode is about to change from the power save mode to an active mode.

3. The memory system according to claim 1, wherein the priorities are determined based on uses of the data stored in the memory units and the buffer units.

4. The memory system according to claim 3, wherein the priorities are determined based on recovery orders of the data stored in the memory units and the buffer units, when the operation mode is about to change from the power save mode to the active mode.

5. The memory system according to claim 1, wherein the priorities are determined based on power consumption amounts of the memory units and the buffer units in the active mode.

6. The memory system according to claim 1, wherein the priorities are determined based on sizes of the data stored in the memory units and the buffer units.

7. The memory system according to claim 1, wherein the priorities are determined based on latencies of the data stored in the memory units and the buffer units,
   wherein the latencies include latencies in backing up the data stored in the memory units and the buffer units in the page buffers, and/or latencies in recovering the data backed up in the page buffers to the respective corresponding memory units and buffer units.

8. The memory system according to claim 1,
   wherein the controller changes the operation mode from the active mode to the power save mode when an operation mode change command is received from a host or an operation in the active mode is not performed for a predetermined time, and
   wherein the controller changes the operation mode from the power save mode to the active mode when the operation mode change command is received from the host or performance of an operation in the active mode is detected.

9. The memory system according to claim 8, wherein, when the operation mode change command is received from the host, the priorities are received.

10. The memory system according to claim 1, wherein the controller stores data storage information indicating that the data stored in the memory units and the buffer units are backed up in the page buffers, in a register that retains a power-on state in the power save mode, before the operation mode changes from the active mode to the power save mode.

11. The memory system according to claim 10, wherein the register is included in a program memory or a power management unit (PMU), which is included in the controller.

12. A method for operating a memory system including a memory device and a controller, the method comprising:
   storing data in a plurality of pages included in the memory device, in an active mode, wherein the memory device includes a plurality of blocks suitable for storing data and a plurality of page buffers which respectively correspond to the blocks;
   storing data corresponding to an operation in the active mode, in a memory included in the controller;
   backing up the data stored in the memory, not into the blocks but into the page buffers as a final destination for a power save mode, when an operation mode is about to change from the active mode to the power save mode; and
   recovering the data backed up in the page buffers to the memory when the operation mode is about to change from the power save mode to the active mode,
   wherein the memory includes a program memory unit, a data memory unit, a map buffer unit, a write buffer unit, and a read buffer unit,
   wherein the data stored in the memory units and the buffer units are backed up simultaneously or sequentially in the page buffers based on priorities of the program memory unit, the data memory unit, the map buffer unit, the write buffer unit, and the read buffer unit in order, before the power save mode begins, and
   wherein the data backed up in the page buffers are recovered to the respective corresponding memory units and buffer units, when the operation is about to change from the power save mode to the active mode.

13. The method according to claim 12, wherein the priorities are determined based on at least one of power consumption amounts of the memory units and the buffer units in the active mode and uses, sizes, and latencies of the data stored in the memory units and the buffer units.

14. The method according to claim 12, wherein the priorities are determined based on latencies of the data stored in the memory units and the buffer units,
wherein the latencies include latencies in backing up the data stored in the memory units and the buffer units, in the page buffers, and/or latencies in recovering the data backed up in the page buffers, to the respective corresponding memory units and buffer units.

15. The method according to claim 12,
wherein the change to the power save mode is made when an operation mode change command is received from a host or an operation in the active mode is not performed for a predetermined time, and
wherein the change to the active mode is made when the operation mode change command is received from the host or performance of an operation in the active mode is detected.

16. The method according to claim 12, wherein, in the backing up the data, data storage information, indicating that the data stored in the memory units and the buffer units are backed up in the page buffers, is stored in a register that retains a power-on state in the power save mode, before the change to the power save mode from the active mode.

* * * * *